US010056928B2

(12) United States Patent
Kang et al.

(10) Patent No.: US 10,056,928 B2
(45) Date of Patent: Aug. 21, 2018

(54) METHOD AND APPARATUS FOR CONTROLLING INTERFERENCE IN MOBILE COMMUNICATION SYSTEM

(71) Applicants: Samsung Electronics Co., Ltd., Suwon-si (KR); Korea Advanced Institute of Science and Technology, Daejeon (KR)

(72) Inventors: Myung-Gil Kang, Daejeon (KR); Wan Choi, Daejeon (KR); Dae-Kyu Shin, Daejeon (KR); Sang-Wook Suh, Yongin-si (KR)

(73) Assignees: SAMSUNG ELECTRONICS CO., LTD. (KR); KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 0 days.

(21) Appl. No.: 14/825,017

(22) Filed: Aug. 12, 2015

(65) Prior Publication Data
US 2016/0049968 A1 Feb. 18, 2016

(30) Foreign Application Priority Data

Aug. 12, 2014 (KR) .......................... 10-2014-0104178

(51) Int. Cl.
*H04B 1/04* (2006.01)
*H04B 1/12* (2006.01)

(52) U.S. Cl.
CPC .................................... *H04B 1/126* (2013.01)

(58) Field of Classification Search
CPC .... H04B 1/0475; H04B 1/525; H04B 1/1027; H04B 17/004; H04B 17/0042;
(Continued)

(56) References Cited

U.S. PATENT DOCUMENTS

2009/0029710 A1   1/2009  Ochiai et al.
2009/0247166 A1*  10/2009 Luo ..................... H04W 72/02
                                                  455/436
(Continued)

OTHER PUBLICATIONS

IEEE Transaction on Information Theory, V. R. Cadambe, S. A. Jafar, "Interference Alignment and Degrees of Freedom of the K-user Interference Channel," Aug. 2008.

*Primary Examiner* — Nhan Le
(74) *Attorney, Agent, or Firm* — McAndrews, Held & Malloy, Ltd.

(57) ABSTRACT

The present disclosure relates to a pre-$5^{th}$-Generation (5G) or 5G communication system to be provided for supporting higher data rates beyond $4^{th}$-Generation (4G) communication system such as a Long Term Evolution (LTE). A method for controlling interference in a signal transmitting apparatus in a mobile communication system is provided. The method includes transmitting data to a first signal receiving apparatus using a plurality of channels; receiving information indicating whether at least one of the plurality of channels exists as an interference channel in a second signal receiving apparatus from the second signal receiving apparatus; receiving interference control information for controlling interference for the second signal receiving apparatus from the second signal receiving apparatus based on the received information, and generating interference control data based on the interference control information; and transmitting the interference control data to the first signal receiving apparatus.

12 Claims, 12 Drawing Sheets

(58) Field of Classification Search
CPC .. H04B 17/0057; H04W 16/16; H04W 28/04; H04W 24/00; H03F 1/3247; H03F 1/32; H03F 1/32934
USPC ............ 455/114.2, 67.13, 67.11, 63.1, 226.1
See application file for complete search history.

(56) References Cited

U.S. PATENT DOCUMENTS

| | | | |
|---|---|---|---|
| 2010/0303182 A1* | 12/2010 | Daneshrad ........... | H04B 1/7102 375/346 |
| 2011/0243204 A1* | 10/2011 | Yeh ...................... | H04B 7/0452 375/220 |
| 2011/0310827 A1* | 12/2011 | Srinivasa ............. | H04B 7/0434 370/329 |
| 2012/0307706 A1* | 12/2012 | Nakano ................ | H04J 11/0033 370/312 |

* cited by examiner

METHOD AND APPARATUS FOR CONTROLLING INTERFERENCE IN MOBILE COMMUNICATION SYSTEM

RELATED APPLICATION(S)

This application claims the benefit under 35 U.S.C. § 119(a) of a Korean patent application filed in the Korean Intellectual Property Office on Aug. 12, 2014 assigned Serial No. 10-2014-0104178, the entire disclosure of which is incorporated herein by reference.

BACKGROUND

The present disclosure relates to a method and apparatus for controlling interference in a mobile communication system.

To meet the demand for wireless data traffic, which has increased since deployment of $4^{th}$-generation (4G) communication systems, efforts have been made to develop an improved $5^{th}$-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

In order to increase total performance of a system in a network, it is effective to decrease impact of interference between user equipments (UEs) which communicate on the same frequency at the same time. A typical scheme for this is a technology such as an interference ordering scheme, and the technology may acquire the optimal degree of freedom. However, the technology requires massive amount of channel information which a signal transmitting apparatus and a signal receiving apparatus need to exchange, so it is difficult to feedback all information in real time. Specially, in a network environment in which a multiple antenna is used, amount of feedback information is significantly increased, so a limitation and burden becomes increased.

Meanwhile, if a signal transmitting apparatus is unable to receive channel information from a signal receiving apparatus, a time division multiplexing (TDM) scheme may be used. However, in a case that the TDM scheme is used, if the number of UEs increases, performance may degrade, so only the degree of freedom which is significantly lower than the degree of freedom which may be acquired in a current network may be acquired.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of the present disclosure is to provide an apparatus and method for controlling interference in a mobile communication system.

Another aspect of the present disclosure is to provide an apparatus and method for controlling interference by considering feedback time delay for interference channel connection information in a mmWave mobile communication system.

Another aspect of the present disclosure is to provide an apparatus and method for controlling interference by considering feedback time delay for interference channel connection information in a case that signal transmitting apparatuses may not know information related to a channel among the signal transmitting apparatuses and signal receiving apparatuses in a mmWave mobile communication system.

In accordance with an aspect of the present disclosure, a method for controlling interference in a signal transmitting apparatus in a mobile communication system is provided. The method includes transmitting data to a first signal receiving apparatus using a plurality of channels; receiving information indicating whether at least one of the plurality of channels exists as an interference channel in a second signal receiving apparatus from the second signal receiving apparatus; receiving interference control information for controlling interference for the second signal receiving apparatus from the second signal receiving apparatus based on the received information, and generating interference control data based on the interference control information; and transmitting the interference control data to the first signal receiving apparatus.

In accordance with another aspect of the present disclosure, a method for controlling interference in a first signal receiving apparatus in a mobile communication system is provided. The method includes receiving data which is transmitted from a signal transmitting apparatus using a plurality of channels; and receiving interference control data from the signal transmitting apparatus, wherein the interference control data is generated based on control interference information for controlling interference for a second signal receiving apparatus according to whether at least one of the plurality of channels exists as an interference channel in the second signal receiving apparatus.

In accordance with another aspect of the present disclosure, a method for controlling interference in a signal transmitting apparatus in a mobile communication system is provided. The method includes transmitting data to each of a plurality of signal receiving apparatuses using different channels; receiving information related to an interference channel from each of the plurality of signal receiving apparatuses; determining channel connection status among the signal transmitting apparatus and the plurality of signal receiving apparatuses based on information related the different channels and the interference channel; generating interference control data for controlling interference for each of the plurality of signal receiving apparatuses; and transmitting the interference control data to each of the plurality of signal receiving apparatuses.

In accordance with another aspect of the present disclosure, a method for controlling interference in a signal receiving apparatus in a mobile communication system is provided. The method includes receiving data from a signal transmitting apparatus using a plurality of channels; performing a channel estimating operation; determining whether there is an interference channel based on the channel estimation result; transmitting information related to the interference channel based on the determined result; and receiving interference control data from the signal transmitting apparatus, wherein the interference control data is generated based on channel connection status according to information related to the plurality of channels and the interference channel, and the plurality of channels are different from a plurality of channels which the signal receiving apparatus and other signal receiving apparatuses use.

In accordance with another aspect of the present disclosure, a signal transmitting apparatus in a mobile communication system is provided. The signal transmitting apparatus includes a transmitter configured to transmit data to a first signal receiving apparatus using a plurality of channels; a receiver configured to receive information indicating whether at least one of the plurality of channels exists as an interference channel in a second signal receiving apparatus from the second signal receiving apparatus, and receive interference control information for controlling interference for the second signal receiving apparatus from the second signal receiving apparatus based on the received information; and a controller configured to generate interference control data based on the interference control information, and controls the transmitter to transmit the interference control data to the first signal receiving apparatus.

In accordance with another aspect of the present disclosure, a first signal receiving apparatus in a mobile communication system is provided. The first signal receiving apparatus includes a receiver configured to receive data which is transmitted from a signal transmitting apparatus using a plurality of channels; and a controller configured to control the receiver to receive interference control data from the signal transmitting apparatus, wherein the interference control data is generated based on control interference information for controlling interference for a second signal receiving apparatus according to whether at least one of the plurality of channels exists as an interference channel in the second signal receiving apparatus.

In accordance with another aspect of the present disclosure, a signal transmitting apparatus in a mobile communication system is provided. The signal transmitting apparatus includes a transmitter configured to transmit data to each of a plurality of signal receiving apparatuses using different channels; a receiver configured to receive information related to an interference channel from each of the plurality of signal receiving apparatuses; and a controller configured to determine channel connection status among the signal transmitting apparatus and the plurality of signal receiving apparatuses based on information related the different channels and the interference channel, generate interference control data for controlling interference for each of the plurality of signal receiving apparatuses, and control the transmitter to transmit the interference control data to each of the plurality of signal receiving apparatuses.

In accordance with another aspect of the present disclosure, a signal receiving apparatus in a mobile communication system is provided. The signal receiving apparatus includes a transmitter; a receiver configured to receive data from a signal transmitting apparatus using a plurality of channels; and a controller configured to determine whether there is an interference channel based on a channel estimation result, control the transmitter to transmit information related to the interference channel based on the determined result, and control the receiver to receive interference control data from the signal transmitting apparatus, wherein the interference control data is generated based on channel connection status according to information related to the plurality of channels and the interference channel, and the plurality of channels are different from a plurality of channels which the signal receiving apparatus and other signal receiving apparatuses use.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
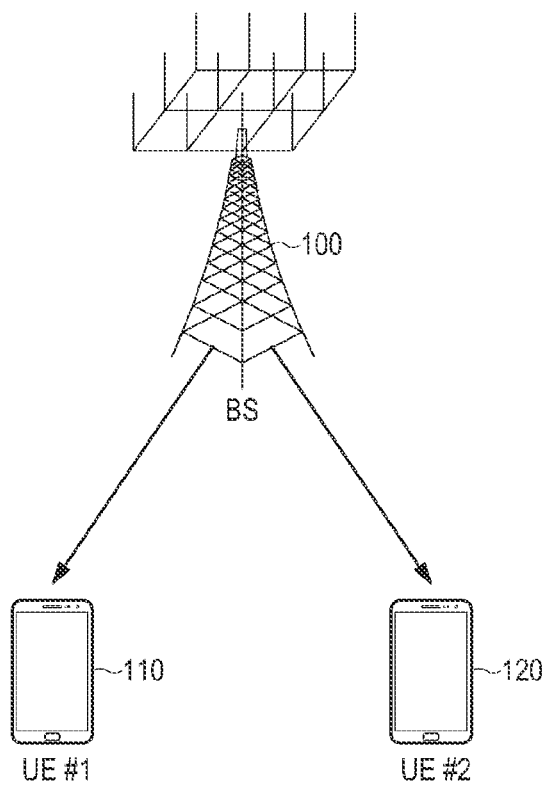
FIG. 1 schematically illustrates a structure of a mobile communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes an apparatus and method for controlling interference in a mobile communication system.

An embodiment of the present disclosure proposes an apparatus and method for controlling interference by considering feedback time delay for interference channel connection information in a millimeter wave (mmWave) mobile communication system.

An embodiment of the present disclosure proposes an apparatus and method for controlling interference by considering feedback time delay for interference channel connection information in a case that signal transmitting apparatuses may not recognize information related to a channel among the signal transmitting apparatuses and signal receiving apparatuses in a mmWave mobile communication system.

A method and apparatus proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3$^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system and/or the like.

According to various embodiments of the present disclosure, for example, a signal transmitting apparatus may be a base station (BS), and a signal receiving apparatus may be a user equipment (UE).

Interference control schemes which are implemented and considered in a current mobile communication system are based on an assumption that all BSs recognize channel information among all BSs and UEs under an interference channel environment, and do not consider time delay due to feedback for interference channel information.

An interference control scheme which is based on interference channel information which is fed back after time delay requires all of real-time interference channel information, so this interference control scheme may be used for supplementing situations such as a situation that excessive amount of information is fed back, an ineffective usage of a time/frequency resource, and the like. So, a scheme of controlling interference by considering time delay after the interference channel information is fed back is highly necessary and important. Specially, an interference control scheme for effectively removing impact of interference and maximizing performance of a UE in a situation that various communication structures are researched as a standard model of the next generation mobile communication system is highly necessary.

A scheme of controlling interference in an interference channel environment requires channel information for all nodes at which interference occurs in order to decrease impact of interference for all BSs. If the number of nodes is increased and channel information is changed in real time, it is difficult for BSs to exchange channel information for all nodes, so it is difficult for implementing an interference control scheme which satisfies the requirement.

So, in order to decrease degradation of total performance of a mobile communication system, a need of an interference control scheme in which relatively small amount of information is fed back increases.

Further, in a mobile communication system, since BSs which have various structures and various functions need to be considered, a need of an interference control scheme which may effectively control interference in a complex communication environment in which the BSs which have the various structures and the various functions becomes increased.

A structure of a mobile communication system according to an embodiment of the present disclosure will be described with reference to FIG. 1.

FIG. 1 schematically illustrates a structure of a mobile communication system according to an embodiment of the present disclosure.

Referring to FIG. 1, the mobile communication system may be a mobile communication system under a mmWave environment that a channel connection is rapidly changed according to a movement of a UE, and support an interference control operation which considers channel information feedback delay. The mobile communication system includes a BS 100 and a plurality of UEs, e.g., two UEs, e.g., a UE #1110 and a UE #2120.

The BS 100 communicates with the plurality of UEs using a plurality of antennas, e.g., two antennas. For example, the BS 100 may communicate with the UE #1110 and the UE #2120 using two antennas. In FIG. 1, the mobile communication system includes one BS, however, it will be understood by those of ordinary skill in the art that the mobile communication system may include a plurality of BSs which are capable of cooperating one another.

The BS 100 may receive information related to location of each of the UE #1110 and the UE #2120 in real time, and each of the UE #1110 and the UE #2120 may perform a channel estimating operation. Each of the UE #1110 and the UE #2120 may transmit interference channel connection information indicating whether each of the UE #1110 and the UE #2120 is connected to a channel which occurs interference, i.e., an interference channel to the BS 100 instead of transmitting information related to all channels to the BS 100 in order to effectively control interference. For example, the interference channel connection information may be implemented with one bit, and may indicate whether a related UE is connected to the interference channel using a value of 0 or 1.

Meanwhile, channel connection status among the BS 100, the UE #1110, and the UE #2120 in a mobile communication system in FIG. 1 will be described with reference to FIG. 2.

Figure 2:
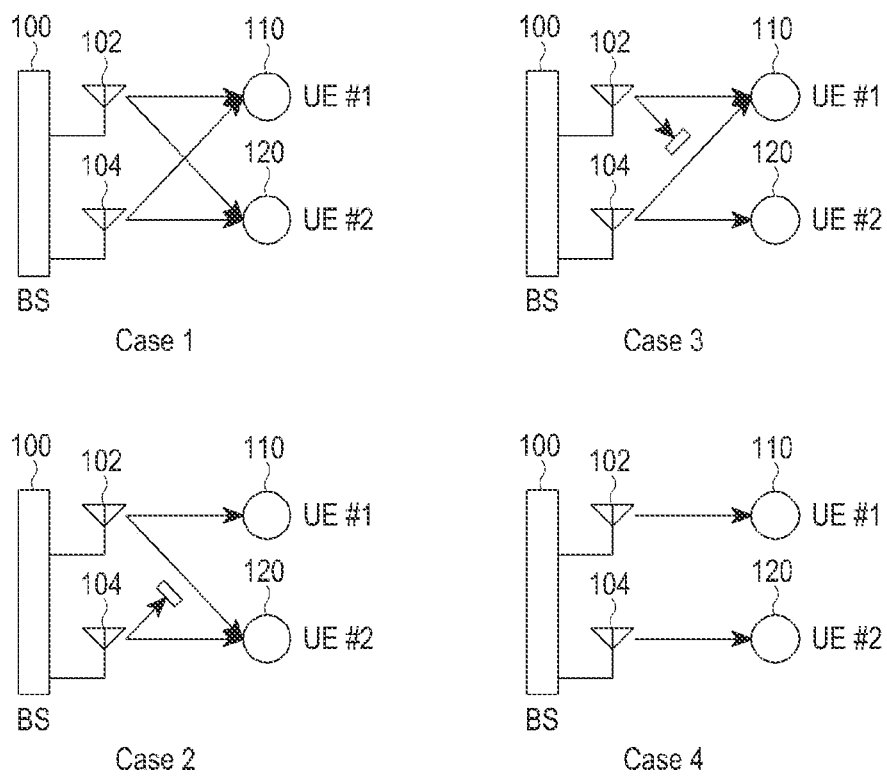
FIG. 2 schematically illustrates an example of channel connection status among a base station (BS) and user equipments (UEs) in a mobile communication system according to an embodiment of the present disclosure.

FIG. 2 schematically illustrates an example of channel connection status among a BS and UEs in a mobile communication system according to an embodiment of the present disclosure.

Referring to FIG. 2, in a mobile communication system in which a BS 100 communicates with a UE #1110 and a UE #2120 using two antennas, there may be four channel connection status cases, i.e., a channel connection status case 1, a channel connection status case 2, a channel connection status case 3, and a channel connection status case 4.

Each of the channel connection status case 1, the channel connection status case 2, the channel connection status case 3, and the channel connection status case 4 will be described below.

Firstly, the channel connection status case 1 denotes channel connection status in a case that an antenna #1 102 and an antenna #2 104 of the BS 100, the UE #1110, and the UE #2120 are connected.

Secondly, the channel connection status case 2 denotes channel connection status in a case that the antenna #1 102, the UE #1110, and the UE #2120 are connected, while the antenna #2 104 is not connected to the UE #1110, but is connected to the UE #2120.

Thirdly, the channel connection status case 3 denotes channel connection status in a case that the antenna #1 102 is connected to the UE #1110, but is not connected to the UE #2120, while the antenna #2 104 is connected to both the UE #1110, and the UE #2120.

Fourthly, the channel connection status case 4 denotes channel connection status in a case that the antenna #1 102 and the antenna #2 104 are connected to the UE #1110 and the UE #2120, respectively.

In an embodiment of the present disclosure, an interference control operation in which the channel connection status case 1, the channel connection status case 2, the channel connection status case 3, and the channel connection status case 4 are considered may be performed. For this, three data transmitting/receiving operations, i.e., a first time data transmitting/receiving operation, a second time data transmitting/receiving operation, and a third time data transmitting/receiving operation may be performed. Each of the first time, the second time, and the third time may denote time in which a related data transmitting/receiving operation is performed without an order, or denote that data transmitting/receiving operations are sequentially performed with an order of the first time, the second time, and the third time.

An interference control operation in which a channel connection status case 1, a channel connection status case 2, a channel connection status case 3, and a channel connection status case 4 are considered according to an embodiment of the present disclosure will be described below.

An example of a data transmitting process performed at the first time in a mobile communication system according to an embodiment of the present disclosure will be described with reference to FIG. 3.

Figure 3:
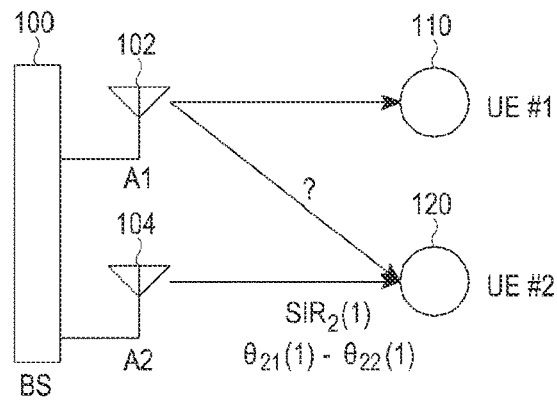
FIG. 3 schematically illustrates an example of a data transmitting process performed at the first time in a mobile communication system according to an embodiment of the present disclosure.

FIG. 3 schematically illustrates an example of a data transmitting process performed at the first time in a mobile communication system according to an embodiment of the present disclosure.

Referring to FIG. 3, the mobile communication system includes a BS 100, UE #1110, and a UE #2 120. The BS 100 includes two antennas, e.g., an antenna #1102 and an antenna #2104.

Firstly, A1 and A2 denote data (or a message) which the UE #1 110 requests. At the first time, the BS 100 transmits A1 to the UE #1 110 using the antenna #1 102, and transmits A2 to the UE #1 110 using the antenna #2 104.

The UE #2120 may be connected to the antenna #2104, and may not be connected to the antenna #1 102. If there is data which is received through the antenna #2104 and/or antenna #1 102 (if, the UE #2120 is connected to the antenna #1 102), the UE #2120 performs a channel estimating operation. The UE #2120 determines whether the UE #2120 is connected to the antenna #1 102 based on the channel estimated result, and generates interference channel connection information based on the determined result. The UE #2120 transmits interference channel connection information of 0 or 1 to the BS 100. For example, the UE #2120 may transmit interference channel connection information of 1 to the BS 100 if the UE #2120 is connected to the antenna #1 102, and transmit interference channel connection information of 0 to the BS 100 if the UE #2120 is not connected to the antenna #1 102.

Upon detecting that the UE #2 120 is connected to the antenna #1 102, the UE #2 120 transmits signal to interference ratio (SIR) information of the UE #2 120 at the first time $SIR_2(1)$ and phase difference information related to a phase difference between a channel related to the antenna #1 120 (an interference channel) and a channel related to the antenna #2 104 (a desired channel) at the first time to the BS 100. For example, if a phase of the interference channel and a phase of the desired channel at the first time are $\theta_{21}(1)$ and $\theta_{22}(1)$, respectively, the phase difference information may include information related to $\theta_{21}(1)$-$\theta_{22}(1)$. Here, a number 1 in parentheses denotes the first time (e.g., t=1).

An example of a data transmitting process performed at the first time in a mobile communication system according to an embodiment of the present disclosure has been described with reference to FIG. 3, and an example of a data transmitting process performed at the second time in a mobile communication system according to an embodiment of the present disclosure will be described with reference to FIG. 4.

Figure 4:
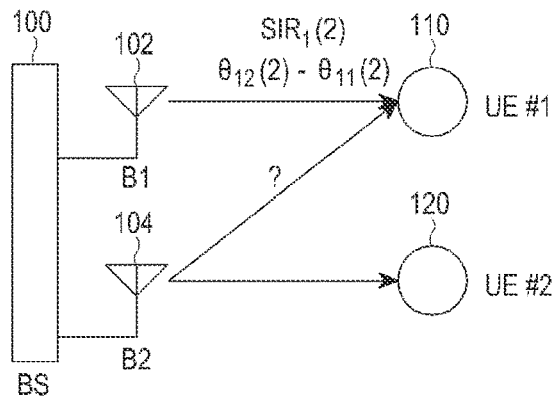
FIG. 4 schematically illustrates an example of a data transmitting process performed at the second time in a mobile communication system according to an embodiment of the present disclosure.

FIG. 4 schematically illustrates an example of a data transmitting process performed at the second time in a mobile communication system according to an embodiment of the present disclosure.

Referring to FIG. 4, the mobile communication system includes a BS 100, UE #1110, and a UE #2 120. The BS 100 includes two antennas, e.g., an antenna #1102 and an antenna #2104.

Firstly, B1 and B2 indicate data (or message) which the UE #2 120 requests. For example, the second time may be time after the first time. In this case, a data transmitting process may be performed at the second time after a data transmitting process is performed at the first time. For another example, the first time may be time after the second time. In this case, a data transmitting process may be performed at the first time after a data transmitting process is performed at the second time.

The BS 100 transmits B1 to the UE #2 120 at the second time using the antenna #1 102, and transmits B2 to the UE #2 120 using the antenna #2 104.

The UE #1 110 may be connected to the antenna #1 102, and may not be connected to the antenna #2 104. If there is data which is received through the antenna #1 102 and/or antenna #2 104 (if, the UE #1 110 is connected to the antenna #2 104), the UE #1 110 performs a channel estimating operation. The UE #1 110 determines whether the UE #1 110 is connected to the antenna #2 104 based on the channel estimated result, and generates interference channel connection information based on the determined result. The UE #1 110 transmits interference channel connection information of 0 or 1 to the BS 100. For example, the UE #1 110 may transmit interference channel connection information of 1 to the BS 100 if the UE #1 110 is connected to the antenna #2 104, and transmit interference channel connection information of 0 to the BS 100 if the UE #1 110 is not connected to the antenna #2 104.

Upon detecting that the UE #1 110 is connected to the antenna #2 104, the UE #1 110 transmits SIR information of the UE #1 110 at the second time $SIR_1(2)$ and phase difference information related to a phase difference between a channel related to the antenna #2 104 (an interference channel) and a channel related to the antenna #1 102 (a desired channel) at the second time to the BS 100. For example, if a phase of the interference channel and a phase of the desired channel at the first time are $\theta_{12}(2)$ and $\theta_{11}(2)$, respectively, the phase difference information may include information related to $\theta_{12}(2)$-$\theta_{11}(2)$. Here, a number 2 in parentheses denotes the second time (e.g., t=2).

An example of a data transmitting process performed at the second time in a mobile communication system according to an embodiment of the present disclosure has been described with reference to FIG. 4, and an example of a data transmitting process performed at the third time in a mobile communication system according to an embodiment of the present disclosure will be described with reference to FIG. 5.

Figure 5:
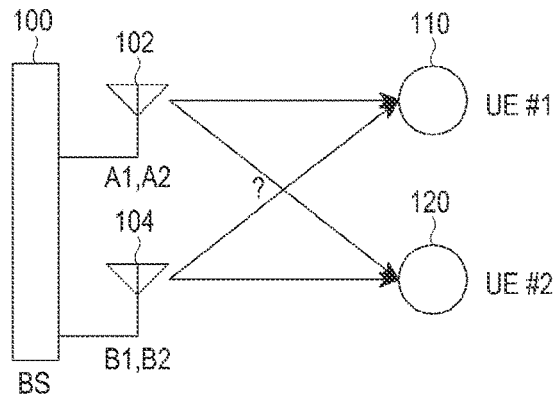
FIG. 5 schematically illustrates an example of a data transmitting process performed at the third time in a mobile communication system according to an embodiment of the present disclosure.

FIG. 5 schematically illustrates an example of a data transmitting process performed at the third time in a mobile communication system according to an embodiment of the present disclosure.

Referring to FIG. 5, the mobile communication system includes a BS 100, UE #1110, and a UE #2 120. The BS 100 includes two antennas, e.g., an antenna #1102 and an antenna #2104.

Firstly, the third time is time after the first time and the second time. The third time is time for transmitting interference control data which controls interference for data transmission performed at the first time and the second time to each UE. At the third time, related interference control data may be transmitted to the UE #1110 and the UE #2120 regardless of whether the antenna #1 102 is connected to the UE #2 120 or whether the antenna #2 104 is connected to the UE #1 110.

Interference control data which the BS 100 may transmit the UE #1 110 using the antenna #1 102 at the third time may be determined based on information which the UE #2 120 has fed back at the first time.

For example, upon receiving interference channel connection information (e.g., 1) indicating that the UE #2 120 is connected to the antenna #1 102 at the first time, the BS 100 may determine interference control data $L_2(1)(A1, A2)$ which the BS 100 may transmit to the UE #1 110 at the third time as expressed in Equation (1) based on SIR information $SIR_2(1)$ and phase difference information $\theta_{21}(1)$-$\theta_{22}(1)$ of the UE #2 120 at the first time which the BS 100 additionally receives.

$$L_2(1)(A1,A2)=A2+A1\cdot|SIR_2(1)|e^{j(\theta_{21}(1)-\theta_{22}(1))} \qquad \text{Equation (1)}$$

Upon receiving interference channel connection information (e.g., 0) indicating that the UE #2 120 is not connected to the antenna #1 102 at the first time, the BS 100 may determine interference control data which the BS 100 may transmit to the UE #1 110 at the third time as A2.

Meanwhile, interference control data which the BS 100 may transmit to the UE #2 110 using the antenna #2 104 at the third time may be determined information which the UE #1 110 has fed back at the first time.

For example, upon receiving interference channel connection information (e.g., 1) indicating that the UE #1 110 is connected to the antenna #2 104 at the second time, the BS 100 may determine interference control data $L_1(2)(B1, B2)$ which the BS 100 may transmit to the UE #2 120 at the third time as expressed in Equation (2) based on SIR information $SIR_1(2)$ and phase difference information $\theta_{12}(2)$-$\theta_{11}(2)$ of the UE #1 110 at the second time which the BS 100 additionally receives.

$$L_1(2)(B1,B2)=B1+B2\cdot|SIR_1(2)|e^{j(\theta_{12}(2)-\theta_{11}(2))} \qquad \text{Equation (2)}$$

Upon receiving interference channel connection information (e.g., 0) indicating that the UE #1 110 is not connected to the antenna #2 104 at the second time, the BS 100 may determine interference control data which the BS 100 may transmit to the UE #2 120 at the third time as B1.

After the interference control data for each of the UE #1110 and the UE #2120 is determined, the BS 100 transmits the determined interference control data to the UE #1110 and the UE #2120 using the antenna #1 102 and the antenna #2 104. Then the UE #1110 and the UE #2120 may perform the following data recovery (decoding) operation.

If the UE #1 110 is connected to the antenna #2 104 at the third time, the UE #1 110 may recover related data $L_2(1)(A1, A2)$ or A2 by canceling interference control data $L_1(2)(B1, B2)$ or B1 which is received from the antenna #2 104 at the third time from data which is received at the first time. If the UE #1 110 is not connected to the antenna #2 104 at the third time, the UE #1 110 may recover related data $L_2(1)(A1, A2)$ or A2 without performing an interference cancel processing operation since the data which is received at the first time is not affected from interference.

If the UE #2 120 is connected to the antenna #1 102 at the third time, the UE #2 120 may recover related data $L_1(2)(B1, B2)$ or B1 by canceling interference control data $L_2(1)(A1, A2)$ or A2 which is received from the antenna #1 102 at the third time from data which is received at the second time. If the UE #2 120 is not connected to the antenna #1 102 at the third time, the UE #2 120 may recover related data $L_1(2)(B1, B2)$ or B1 without performing an interference cancel processing operation since the data which is received at the second time is not affected from interference.

A data recovery method in the UE #1110 and the UE #2120 will be described below.

Firstly, a data recovery method of the UE #1110 and the UE #2120 may be determined based on four channel connection status cases as shown in FIG. 2. The antenna #1 102 and the antenna #2 104 of the BS 100, the UE #1 110, and the UE #2 120 may have four channel connection status cases.

That is, a channel connection status case 1 denotes status in which all of the antenna #1 102 and the antenna #2 104 of the BS 100, the UE #1 110, and the UE #2 120 are connected one another, a channel connection status case 2 denotes status in which the antenna #1 102 is connected to the UE #1 110, and the UE #2 120, and the antenna #2 104 is connected to the UE #2 120, a channel connection status case 3 denotes status in which the antenna #1 102 is connected to the UE #1 110, and the antenna #2 104 is connected to the UE #1 110 and the UE #2 120, and a channel connection status case 4 denotes status in which the antenna #1 102 and the antenna #2 104 are connected to the UE #1 110, and the UE #2 120, respectively.

Figure 6:
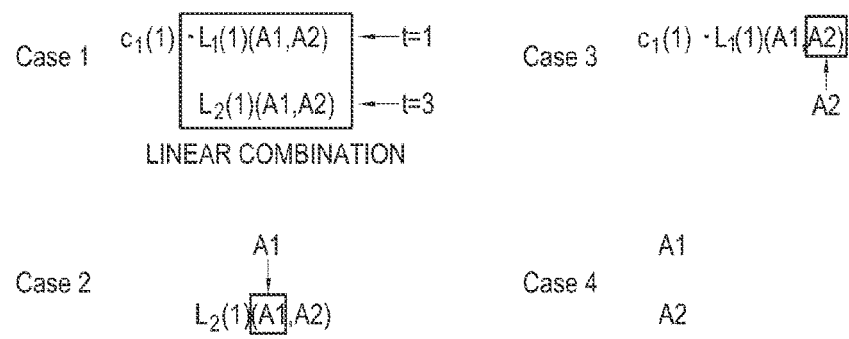
FIG. 6 schematically illustrates an example of a process of performing a data recovery operation in a UE#1 in a mobile communication system according to an embodiment of the present disclosure.
Figure 7:
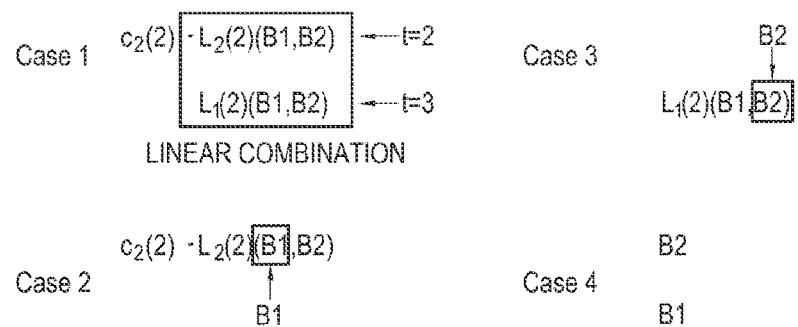
FIG. 7 schematically illustrates an example of a process of performing a data recovery operation in a UE#2 in a mobile communication system according to an embodiment of the present disclosure.

The UE #1 110 and the UE #2 120 may perform a data recovery operation in FIGS. 6 and 7 by considering the four channel connection status cases.

An example of a process of performing a data recovery operation in a UE#1 in a mobile communication system according to an embodiment of the present disclosure will be described with reference to FIG. 6.

FIG. 6 schematically illustrates an example of a process of performing a data recovery operation in a UE#1 in a mobile communication system according to an embodiment of the present disclosure.

Referring to FIG. 6, a UE #1 110 (e.g., a UE #1 110 of FIG. 3) may perform the following decoding operation according that channel connection status at the first time is which one among four channel connection status cases in FIG. 2.

If the channel connection status at the first time is a channel connection status case 1, the UE #1 110 performs a data (A1, A2) recovery operation through a liner combination between data $L_1(1)(A1, A2)$ which is received at the first time and data $L_2(1)(A1, A2)$ which is received at the third time. Here, the data $L_2(1)(A1, A2)$ is data from which interference is canceled or in which there is no interference. Since two equations and two variables are used, so the UE #1 110 may fully recover data (A1, A2).

If the channel connection status at the first time is a channel connection status case 2, the UE #1 110 recovers data A1 which is received at the first time without interference. The UE #1 110 may recover data A2 by substituting the recovered data A1 for data $L_2(1)(A1, A2)$ which is received at the third time. Here, the data $L_2(1)(A1, A2)$ is data from which interference is canceled or in which there is no interference.

If the channel connection status at the first time is a channel connection status case 3, the UE #1 110 recovers data A2 which is received at the third time. Here, the data A2 is data from which interference is canceled or in which there is no interference. The UE #1 110 may recover data A1 by substituting the recovered data A2 for data $L_1(1)(A1, A2)$ which is received at the first time.

If the channel connection status at the first time is a channel connection status case 4, the UE #1 110 recovers data A1 or A2 which is received at the first time and data A2 or A1 which is received at the third time without interference processing.

An example of a process of performing a data recovery operation in a UE#1 in a mobile communication system according to an embodiment of the present disclosure has been described with reference to FIG. 6, and an example of a process of performing a data recovery operation in a UE#2 in a mobile communication system according to an embodiment of the present disclosure will be described with reference to FIG. 7.

FIG. 7 schematically illustrates an example of a process of performing a data recovery operation in a UE#2 in a mobile communication system according to an embodiment of the present disclosure.

Referring to FIG. 7, a UE #2 120 (e.g., a UE #2 120 of FIG. 3) may perform the following decoding operation according that channel connection status at the second time is which one among four channel connection status cases in FIG. 2.

If the channel connection status at the second time is a channel connection status case 1, the UE #2 120 performs a data recovery operation based on a liner combination between data $L_2(2)(B1, B2)$ which is received at the second time and data $L_1(2)(B1, B2)$ which is received at the third time. Here, the data $L_1(2)(B1, B2)$ is data from which interference is canceled or in which there is no interference. Since two equations and two variables are used, so the UE #2 120 may fully recover data (B1, B2).

If the channel connection status at the second time is a channel connection status case 2, the UE #2 120 recovers data B1 which is received at the third time. Here, the data B1 is data from which interference is canceled or in which there is no interference. The UE #2 120 may recover data B2 by substituting the recovered data B1 for data $L_2(2)(B1, B2)$ which is received at the second time.

If the channel connection status at the first time is a channel connection status case 3, the UE #2 120 recovers data B2 which is received at the second time without interference. The UE #2 120 may recover data B1 by substituting the recovered data B2 for data $L_1(2)(B1, B2)$ which is received at the third time. Here, the data $L_1(2)(B1, B2)$ is data from which interference is canceled or in which there is no interference.

If the channel connection status at the second time is a channel connection status case 4, the UE #2 120 recovers data B1 or B2 which is received at the second time and data B2 or B1 which is received at the third time without interference processing.

An example of a process of performing a data recovery operation in a UE#2 in a mobile communication system according to an embodiment of the present disclosure has been described with reference to FIG. 7, and an example of an operating process of a BS in a mobile communication system according to an embodiment of the present disclosure will be described with reference to FIG. 8.

Figure 8:
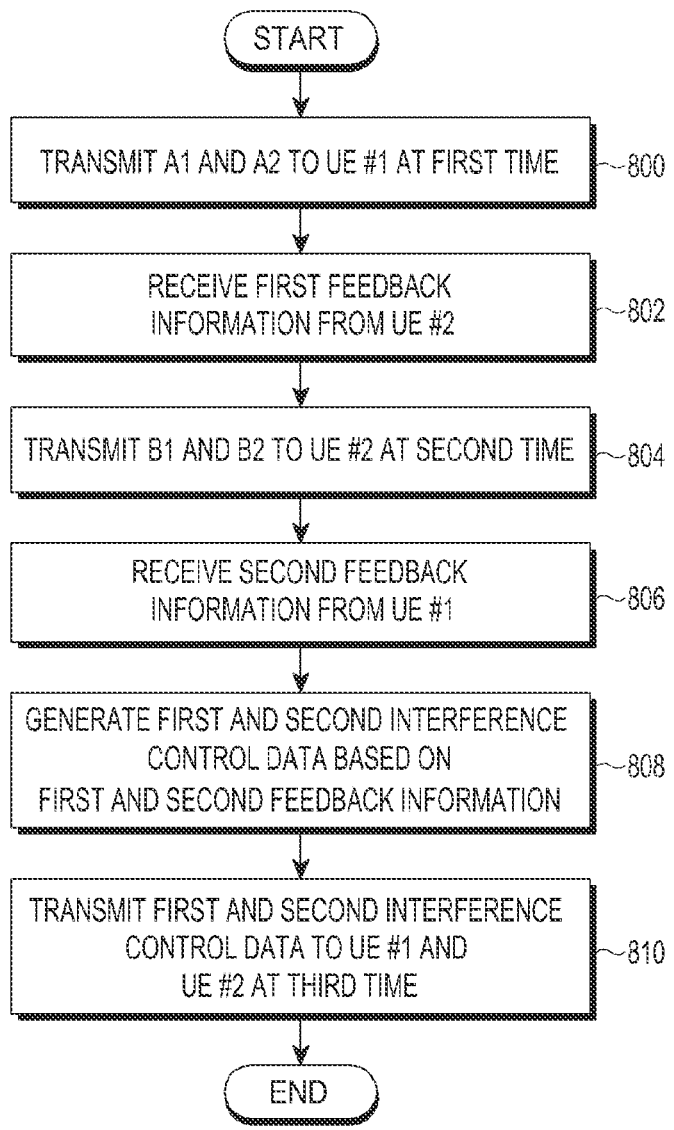
FIG. 8 schematically illustrates an example of an operating process of a BS in a mobile communication system according to an embodiment of the present disclosure.

FIG. 8 schematically illustrates an example of an operating process of a BS in a mobile communication system according to an embodiment of the present disclosure.

Referring to FIG. 8, a BS 100 transmits A1 and A2 to a UE #1 110 using an antenna #1 102 and an antenna #2 104, respectively at operation 800. The BS 100 receives the first feedback information including interference channel connection information indicating whether a UE #2 120 is connected to the antenna #1 102, and SIR information $SIR_2(1)$ and phase difference information $\theta_{21}(1)-\theta_{22}(1)$ of the UE #2 120 at the first time from the UE #2 120 at operation 802.

The BS 100 transmits B1 and B2 to the UE #2 120 using the antenna #1 102 and the antenna #2 104, respectively at operation 804. The BS 100 receives the second feedback information including interference channel connection information indicating whether the UE #1 110 is connected to the antenna #2 104, and SIR information $SIR_1(2)$ and phase difference information $\theta_{12}(2)-\theta_{11}(2)$ of the UE #1 110 at the second time from the UE #1 110 at operation 806.

The BS 100 generates the first interference control data and the second interference control data to be transmitted to the UE #1 110 and the UE #2 120, respectively based on the first feedback information and the second feedback information at operation 808. The first interference control data may be $L_2(1)(A1, A2)$ or A2 according to whether the UE #2 120 is connected to the antenna #1 102 at the first time based on the first feedback information which the UE #2 120 transmits. The second interference control data may be $L_2(1)(A1, A2)$ or A2 according to whether the UE #1 110 is connected to the antenna #2 104 at the second time based on the second feedback information which the UE #1 120 transmits.

After generating the first interference control data and the second interference control data, the BS 100 transmits the first interference control data and the second interference control data to the UE #1 110 and the UE #2 120, respectively at operation 810.

Although FIG. 8 illustrates an example of an operating process of a BS in a mobile communication system according to an embodiment of the present disclosure, various changes could be made to FIG. 8. For example, although shown as a series of operations, various operations in FIG. 8 could overlap, occur in parallel, occur in a different order, or occur multiple times.

An example of an operating process of a BS in a mobile communication system according to an embodiment of the present disclosure has been described with reference to FIG. 8, and an example of an operating process of a UE in a mobile communication system according to an embodiment of the present disclosure will be described with reference to FIG. 9.

Figure 9:
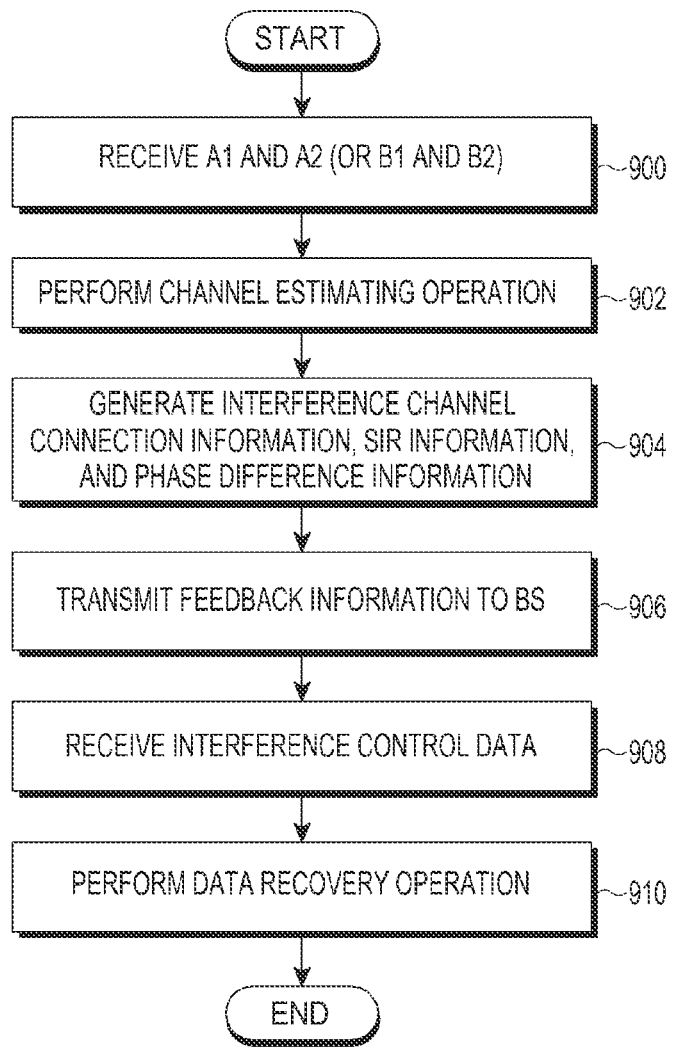
FIG. 9 schematically illustrates an example of an operating process of a UE in a mobile communication system according to an embodiment of the present disclosure.

FIG. 9 schematically illustrates an example of an operating process of a UE in a mobile communication system according to an embodiment of the present disclosure.

Referring to FIG. 9, it will be noted that an operating process of a UE in FIG. 9 may be performed in each of a UE #1 110 and a UE #2 120.

Firstly, a UE receives A1 and A2 (or B1 and B2) which are transmitted from an antenna #1 102 and an antenna #2 104 of a BS 100 (e.g., a BS 100 of FIG. 3) at the first time (or the second time) at operation 900.

The UE performs a channel estimating operation at the second time (or the first time) at operation 902. The UE generates interference channel connection information, SIR information, and phase difference information based on the channel estimated result at operation 904. The UE transmits the generated interference channel connection information, SIR information, and phase difference information to the BS 100 at operation 906.

The UE receives interference control data from the BS 100 at the third time at operation 908. The UE performs a data recovery operation based on at least one of the data which is received at the first time (or the second time) and the interference control data at operation 910. The data recovery operation has been described above, and a detailed description will be omitted herein.

Although FIG. 9 illustrates an example of an operating process of a UE in a mobile communication system according to an embodiment of the present disclosure, various changes could be made to FIG. 9. For example, although shown as a series of operations, various operations in FIG. 9 could overlap, occur in parallel, occur in a different order, or occur multiple times.

An example of an operating process of a UE in a mobile communication system according to an embodiment of the present disclosure has been described with reference to FIG. 9, and another example of a data transmitting process performed in the first time in a mobile communication system according to an embodiment of the present disclosure will be been described with reference to FIG. 10.

Figure 10:
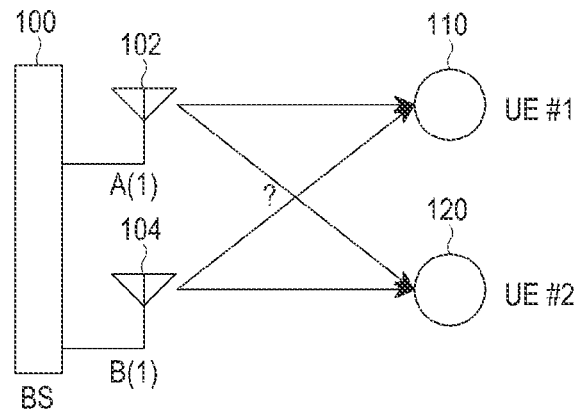
FIG. 10 schematically illustrates another example of a data transmitting process performed in the first time in a mobile communication system according to an embodiment of the present disclosure.

FIG. 10 schematically illustrates another example of a data transmitting process performed in the first time in a mobile communication system according to an embodiment of the present disclosure.

Referring to FIG. 10, A(1) indicates data (or a message) which a UE #1 110 requests at the first time, and B(1) indicates data (or a message) which a UE #2 120 requests at the first time. At the first time, a BS 100 transmits A(1) to the UE #1 110 using the antenna #1 102, and transmits B(1) to the UE#2 120 using the antenna #2 104.

Upon receiving A(1), the UE #1 110 performs a channel estimating operation, and determines whether the UE #1 110 is connected to the antenna #2 104 based on the channel estimated result. The UE #1 110 generates interference channel connection information based on the determined result, and transmits the generated interference channel connection information to the BS 100. The interference channel connection information may be 0 or 1, and this has been described above, so a detailed description will be omitted herein.

Upon receiving B(1), the UE #2 120 performs a channel estimating operation, and determines whether the UE #2 120 is connected to the antenna #1 102 based on the channel estimated result. The UE #2 120 generates interference channel connection information based on the determined result, and transmits the generated interference channel connection information to the BS 100. The interference channel connection information may be 0 or 1, and this has been described above, so a detailed description will be omitted herein.

Another example of a data transmitting process performed in the first time in a mobile communication system according to an embodiment of the present disclosure has been described with reference to FIG. 10, and another example of a data transmitting process performed in the second time in a mobile communication system according to an embodiment of the present disclosure will be described with reference to FIG. 11.

Figure 11:
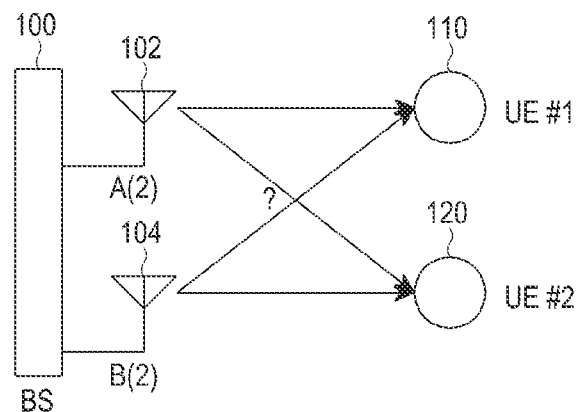
FIG. 11 schematically illustrates another example of a data transmitting process performed in the second time in a mobile communication system according to an embodiment of the present disclosure.

FIG. 11 schematically illustrates another example of a data transmitting process performed in the second time in a mobile communication system according to an embodiment of the present disclosure.

Referring to FIG. 11, A(2) indicates data (or a message) which a UE #1 110 requests at the second time, and B(2) indicates data (or a message) which a UE #2 120 requests at the second time.

At the second time, a BS 100 transmits A(2) to the UE #1 110 using the antenna #1 102, and transmits B(2) to the UE#2 120 using the antenna #2 104.

Upon receiving A(2), the UE #1 110 performs a channel estimating operation, and determines whether the UE #1 110 is connected to the antenna #2 104 based on the channel estimated result. The UE #1 110 generates interference channel connection information based on the determined result, and transmits the interference channel connection information to the BS 100. The interference channel connection information may be 0 or 1, and this has been described above, so a detailed description will be omitted herein.

Upon receiving B(2), the UE #2 120 performs a channel estimating operation, and determines whether the UE #2 120 is connected to the antenna #1 102 based on the channel estimated result. The UE #2 120 generates interference channel connection information based on the determined result, and transmits the interference channel connection information to the BS 100. The interference channel connection information may be 0 or 1, and this has been described above, so a detailed description will be omitted herein.

Another example of a data transmitting process performed in the second time in a mobile communication system according to an embodiment of the present disclosure has been described with reference to FIG. 11, and an example of channel connection form among a BS and UEs in the first time and the second time in a mobile communication system according to an embodiment of the present disclosure will be described with reference to FIG. 12.

Figure 12:
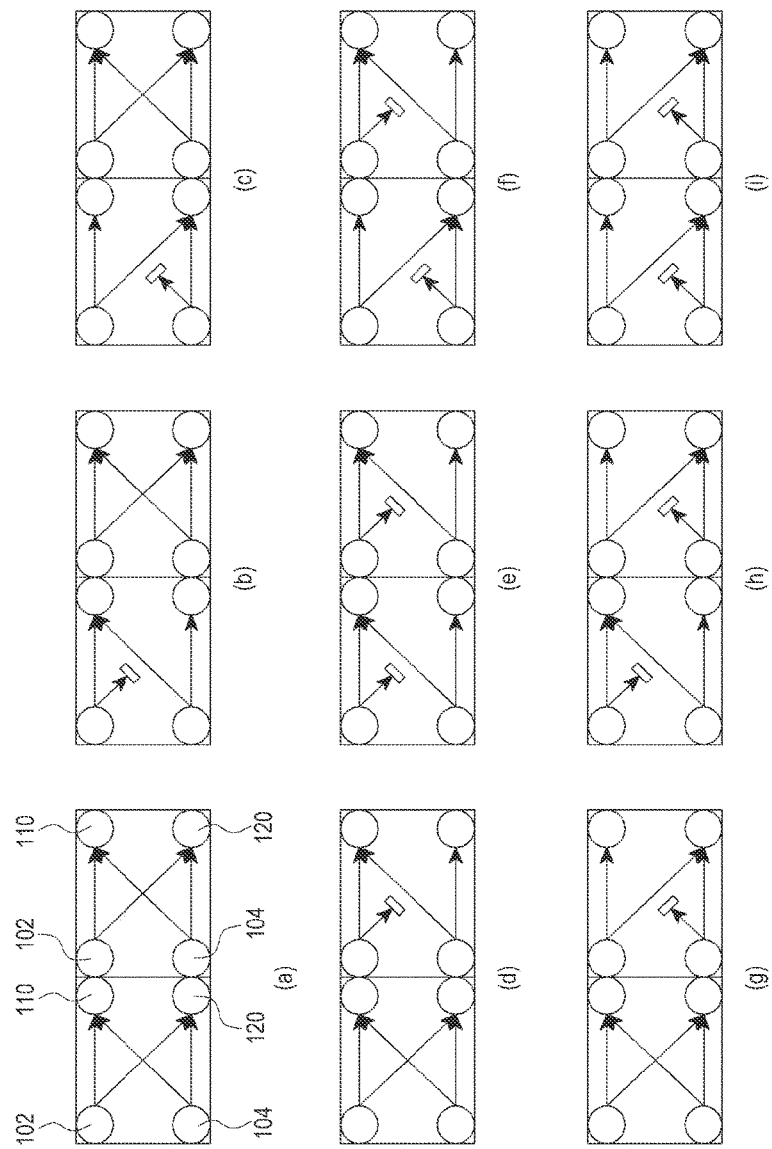
FIG. 12 schematically illustrates an example of channel connection form among a BS and UEs in the first time and the second time in a mobile communication system according to an embodiment of the present disclosure.

FIG. 12 schematically illustrates an example of channel connection form among a BS and UEs in the first time and the second time in a mobile communication system according to an embodiment of the present disclosure.

Combinations of connectable channels among an antenna #1 102 and an antenna #2 104 of a BS 100, a UE #1 110, and a UE #2 120 at the first time and the second time are illustrated in FIG. 12.

Remaining cases except for a case that the antenna #1 102 and the antenna #2 104 of the BS 100, the UE #1 110, and the UE #2 120 are not connected (that is, it is possible to transmit data without interference) are illustrated in FIG. 12. That is, (a) to (i) in FIG. 12 indicate nine combinations which are connectable among the antenna #1 102 and the antenna #2 104 of the BS 100, the UE #1 110, and the UE #2 120.

A left side of each of (a) to (i) in FIG. 12 indicates connection form among the antenna #1 102 and the antenna #2 104 of the BS 100, the UE #1 110, and the UE #2 120 at the first time, and a right side of each of (a) to (i) in FIG. 12 indicates connection form among the antenna #1 102 and the antenna #2 104 of the BS 100, the UE #1 110, and the UE #2 120 at the second time. In a case of (f) and (h), a data transmitting operation at the third time is performed after the first time and the second time.

For remaining combinations except for (f) and (h) among the nine combinations, a data transmitting operation is performed at the third time and/or the fourth time after the first time and the second time.

For remaining combinations except for (f) and (h) in FIG. 12, the BS 100 performs the following operation.

The BS 100 transmits data to a UE which is connected to the BS 100 at the first time at the third time using a related antenna. For example, the BS 100 transmits B(1) as interference control data using the antenna #1 102 at the third time if the BS 100 is connected to the UE #1 110 at the first time. The BS 100 transmits A(1) as interference control data using the antenna #2 104 at the third time if the BS 100 is connected to the UE #2 120 at the first time.

The BS 100 does not perform a data transmitting operation using the antenna #1 102 at the third time if the BS 100 is not connected to the UE #1 110 at the first time. The BS 100 does not perform a data transmitting operation using the antenna #2 104 at the third time if the BS 100 is not connected to the UE #2 120 at the first time.

The BS 100 transmits data to a UE which is connected to the BS 100 at the second time at the fourth time using a related antenna. For example, the BS 100 transmits B(2) as interference control data using the antenna #1 102 at the fourth time if the BS 100 is connected to the UE #1 110 at the second time. The BS 100 transmits A(2) as interference control data using the antenna #2 104 at the fourth time if the BS 100 is connected to the UE #2 120 at the second time.

The BS 100 does not perform a data transmitting operation using the antenna #1 102 at the fourth time if the BS 100 is not connected to the UE #1 110 at the second time. The BS 100 does not perform a data transmitting operation using the antenna #2 104 at the fourth time if the BS 100 is not connected to the UE #2 120 at the second time.

In a case of (f) and (h) in FIG. 12, the BS 100 performs the following operation. In a case of (f) in FIG. 12, at the third time, the BS 100 transmits B(2) using the antenna #1 102, and transmits A(1) using the antenna #2 104. In a case of (h) in FIG. 12, at the third time, the BS 100 transmits B(1) using the antenna #1 102, and transmits A(2) using the antenna #2 104.

An example of channel connection form among a BS and UEs in the first time and the second time in a mobile communication system according to an embodiment of the present disclosure has been described with reference to FIG. 12, and another example of a data transmitting process in a mobile communication system according to an embodiment of the present disclosure will be described with reference to FIG. 13.

Figure 13:
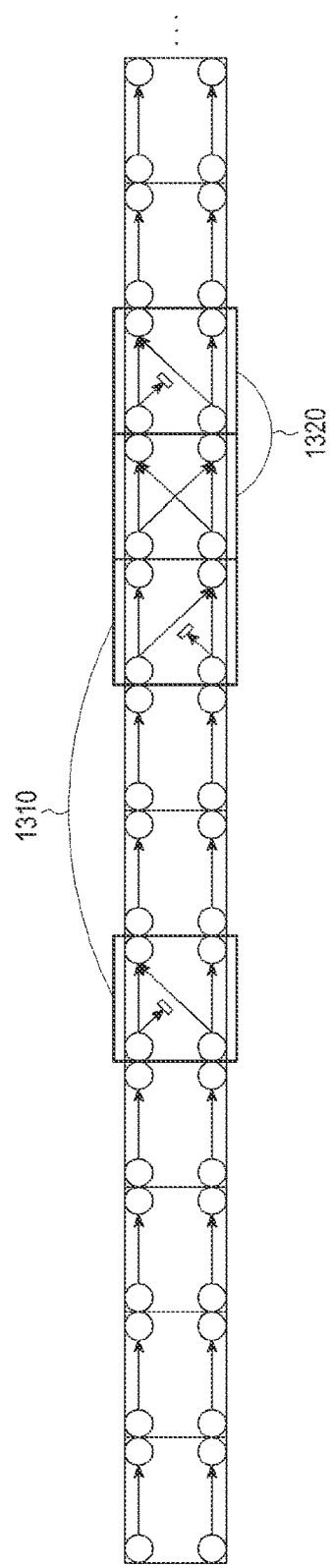
FIG. 13 schematically illustrates another example of a data transmitting process in a mobile communication system according to an embodiment of the present disclosure.

FIG. 13 schematically illustrates another example of a data transmitting process in a mobile communication system according to an embodiment of the present disclosure.

Referring to FIG. 13, a BS 100 (e.g., a BS 100 of FIG. 3) continuously performs data transmitting operations at the first time and the second time for time that delay may be permitted, and additionally performs data transmitting operations at the third time and/or the fourth time for controlling interference according to channel connection status at the first time and the second time corresponds to which one of nine combinations in FIG. 12.

For example, in FIG. 13, a combination 1310 of the fifth channel connection status and the eighth channel connection status corresponds to (h) in FIG. 12, so the BS 100 performs a data transmitting operation at the third time according to (h) in FIG. 12. In FIG. 13, a combination 1320 of the ninth channel connection status and the tenth channel connection status corresponds to (d) in FIG. 12, so the BS 100 additionally performs a data transmitting operation at the third time and the fourth time according to (d) in FIG. 12.

A data recovery operation in a UE in a mobile communication system according to an embodiment of the present disclosure will be described below.

In status in which an antenna #1 102 is connected to a UE #1 110, and an antenna #2 104 is connected to a UE #2 120, various data recovery schemes for each of cases which are classified according to whether an interference channel is connected may be used.

If channel connection status at the first time corresponds to one of remaining combinations except for (f) and (h) in FIG. 12, the UE #1 110 may use a data recovery scheme as expressed in Table 1 at the third time.

TABLE 1

| | | |
|---|---|---|
| $h_{11}(1)A(1) + h_{12}(1)\boxed{B(1)}$ ← t = 1 | | Case 1-1 |
| ↑ | | |
| B(1) ← t = 3 | | |
| $\boxed{h_{11}(1)A(1) + h_{12}(1)B(1)}$ ← t = 1 | | Case 1-2 |
| $\boxed{h_{11}(3)B(1) + h_{12}(3)A(1)}$ ← t = 3 | | |
| linear combination | | |
| A(1) ← t = 1 | | Case 2 |
| $h_{11}(1)A(1) + h_{12}(1)\boxed{B(1)}$ ← t = 1 | | Case 3 |
| ↑ | | |
| B(1) ← t = 3 | | |
| A(1) ← t = 1 | | Case 4 |

In Table 1, in a case that all of the antenna #1 102 and the antenna #2 104 of the BS 100, the UE #1 110, and the UE #2 120 are connected one another at the first time, and the UE #1 110 is not connected to the antenna #2 104 of the BS 100 at the third time (a channel connection status case 1-1), the UE #1 110 recovers data A(1) to be received by substituting data which is received at the third time for data which is received at the first time or removing the data which is received at the third time from the data which is received at the first time.

For example, in a case that the data which the UE #1 110 receives at the third time is B(1), and the data which the UE #1 110 receives at the first time is $h_{11}(1)A(1)+h_{12}(1)B(1)$, the UE #1 110 may recover data A(1) by substituting B(1) for $h_{11}(1)A(1)+h_{12}(1)B(1)$. Here, $h_{11}(1)$ denotes a channel between the antenna #1 102 and the UE #1 110 at the first time, and $h_{12}(1)$ denotes a channel between the antenna #1 102 and the UE #2 120 at the first time.

Meanwhile, in a case that all of the antenna #1 102 and the antenna #2 104 of the BS 100, the UE #1 110, and the UE #2 120 are connected one another at the first time, and the UE #1 110 is connected to the antenna #2 104 of the BS 100 at the third time (a channel connection status case 1-2), the UE #1 110 recovers data A(1) to be received by linearly combining data which is received at the first time and data which is received at the third time.

For example, in a case that the data which the UE #1 110 receives at the first time is $h_{11}(1)A(1)+h_{12}(1)B(1)$, and the data which the UE #1 110 receives at the third time is $h_{11}(3)B(1)+h_{12}(3)A(1)$, the UE #1 110 may recover data A(1) by linearly combining $h_{11}(1)A(1)+h_{12}(1)B(1)$ and $h_{11}(3)B(1)+h_{12}(3)A(1)$. Here, $h_{11}(3)$ denotes a channel between the antenna #1 102 and the UE #1 110 at the third time, and $h_{12}(3)$ denotes a channel between the antenna #1 102 and the UE #2 120 at the third time.

Meanwhile, in a case that at the first time, the antenna #1 102 of the BS 100, the UE #1 110, and the UE #2 120 are connected one another, the antenna #2 104 of the BS 100 is connected to the UE #2 120, and the antenna #2 104 is not connected to the UE #1 100 (a channel connection status case 2), the UE #1 110 may receive data A(1) without interference at the first time, so the UE #1 110 may recover the data A(1).

In a case that at the first time, the antenna #1 102 of the BS 100 is connected to the UE #1 110, the antenna #1 102 is not connected to the UE #2 120, and the antenna #2 104 is connected to the UE #1 110 and the UE #2 120 (a channel connection status case 3), the UE #1 110 may recover data A(1) by substituting data B(1) which the UE #1 110 receives at the third time for data $h_{11}(1)A(1)+h_{12}(1)B(1)$ which the UE #1 110 receives at the first time or by removing the data B(1) which the UE #1 110 receives at the third time from the data $h_{11}(1)A(1)+h_{12}(1)B(1)$ which the UE #1 110 receives at the first time.

In a case that the antenna #1 102 and the antenna #2 104 of the BS 100 are connected to the UE #1 110 and the UE #2 120, respectively, at the first time (a channel connection status case 4), the UE #1 110 may receive data A(1) without interference at the first time, so the UE #1 110 may recover data A(1).

If channel connection status at the first time and the second time corresponds to one of remaining combinations except for (f) and (h) in FIG. 12, the UE #2 120 may use a data recovery scheme as expressed in Table 2 at the third time.

TABLE 2

| | | |
|---|---|---|
| $h_{11}(1)\boxed{A(1)} + h_{22}(1)B(1)$ ← t = 1 | | Case 1-1 |
| ↑ | | |
| A(1) ← t = 3 | | |
| $h_{21}(1)A(1) + h_{22}(1)B(1)$ ← t = 1 | | Case 1-2 |
| $h_{21}(3)B(1) + h_{22}(3)A(1)$ ← t = 3 | | |
| linear combination | | |
| $h_{21}(1)\boxed{A(1)} + h_{22}(1)B(1)$ ← t = 1 | | Case 2 |
| ↑ | | |
| A(1) ← t = 3 | | |
| B(1) ← t = 1 | | Case 3 |
| B(1) ← t = 1 | | Case 4 |

In Table 2, in a case that all of the antenna #1 102 and the antenna #2 104 of the BS 100, the UE #1 110, and the UE #2 120 are connected one another at the first time, and the UE #2 120 is not connected to the antenna #1 102 of the BS 100 at the third time (a channel connection status case 1-1), the UE #2 120 recovers data B(1) to be received by substituting data which is received at the third time for data which is received at the first time or removing the data which is received at the third time from the data which is received at the first time.

For example, in a case that the data which the UE #2 120 receives at the third time is A(1), and the data which the UE #2 120 receives at the first time is $h_{21}(1)A(1)+h_{22}(1)B(1)$, the UE #2 120 may recover data B(1) by substituting A(1) for $h_{21}(1)A(1)+h_{22}(1)B(1)$. Here, $h_{21}(1)$ denotes a channel between the antenna #2 104 and the UE #1 110 at the first time, and $h_{22}(1)$ denotes a channel between the antenna #2 104 and the UE #2 120 at the first time.

Meanwhile, in a case that all of the antenna #1 102 and the antenna #2 104 of the BS 100, the UE #1 110, and the UE #2 120 are connected one another at the first time, and the UE #2 120 is connected to the antenna #1 102 of the BS 100 at the third time (a channel connection status case 1-2), the UE #2 120 recovers data B(1) to be received by linearly combining data which is received at the first time and data which is received at the third time.

For example, in a case that the data which the UE #2 120 receives at the first time is $h_{21}(1)A(1)+h_{22}(1)B(1)$, and the data which the UE #2 120 receives at the third time is $h_{21}(3)B(1)+h_{22}(3)A(1)$, the UE #2 120 may recover data B(1) by linearly combining $h_{21}(1)A(1)+h_{22}(1)B(1)$ and $h_{21}(3)B(1)+h_{22}(3)A(1)$. Here, $h_{21}(3)$ denotes a channel between the antenna #2 104 and the UE #1 110 at the third time, and $h_{22}(3)$ denotes a channel between the antenna #2 104 and the UE #2 120 at the third time.

Meanwhile, in a case that at the first time, the antenna #1 102 of the BS 100, the UE #1 110, and the UE #2 120 are connected one another, the antenna #2 104 of the BS 100 is connected to the UE #2 120, and the antenna #2 104 is not connected to the UE #1 100 (a channel connection status case 2), the UE #2 120 may recover B(1) by substituting data A(1) which the UE #2 120 receives at the third time for the data $h_{21}(1)A(1)+h_{22}(1)B(1)$ which the UE #2 120 receives at the first time or by removing the data A(1) which the UE #2 120 receives at the third time from the data $h_{21}(1)A(1)+h_{22}(1)B(1)$ which the UE #2 120 receives at the first time.

In a case that at the first time, the antenna #1 102 of the BS 100 is connected to the UE #1 110, the antenna #1 102 is not connected to the UE #2 120, and the antenna #2 104 is connected to the UE #1 110 and the UE #2 120 (a channel connection status case 3), the UE #2 120 may receive B(1) without interference at the first time, so the UE #2 120 may recover B(1).

In a case that the antenna #1 102 and the antenna #2 104 of the BS 100 are connected to the UE #1 110 and the UE #2 120, respectively, at the first time (a channel connection status case 4), the UE #2 120 may receive data B(1) without interference at the first time, so the UE #2 120 may recover the data B(1).

If channel connection status at the second time corresponds to one of remaining combinations except for (f) and (h) in FIG. 12, the UE #1 110 may use a data recovery scheme as expressed in Table 3 at the fourth time.

TABLE 3

$h_{11}(2)A(2) + h_{12}(2)\boxed{B(2)}$ ← t = 2    Case 1-1
↑
|
B(2) ← t = 4

$\boxed{h_{11}(2)A(2) + h_{12}(2)B(2)}$ ← t = 2    Case 1-2
$\boxed{h_{11}(4)B(2) + h_{12}(4)A(2)}$ ← t = 4 linear combination

A(2) ← t = 2    Case 2

$h_{11}(2)A(2) + h_{12}(2)\boxed{B(2)}$ ← t = 2    Case 3
↑
|
B(2) ← t = 4

A(2) ← t = 2    Case 4

In Table 3, in a case that all of the antenna #1 102 and the antenna #2 104 of the BS 100, the UE #1 110, and the UE #2 120 are connected one another at the second time, and the UE #1 110 is not connected to the antenna #2 104 of the BS 100 at the fourth time (a channel connection status case 1-1), the UE #1 110 recovers data A(2) to be received by substituting data which is received at the fourth time for data which is received at the second time or removing the data which is received at the fourth time from the data which is received at the second time.

For example, in a case that the data which the UE #1 110 receives at the fourth time is B(2), and the data which the UE #1 110 receives at the second time is $h_{11}(2)A(2)+h_{12}(2)B(2)$, the UE #1 110 may recover A(1) by substituting B(2) for $h_{11}(2)A(2)+h_{12}(2)B(2)$. Here, $h_{11}(2)$ denotes a channel between the antenna #1 102 and the UE #1 110 at the second time, and $h_{12}(2)$ denotes a channel between the antenna #1 102 and the UE #2 120 at the second time.

Meanwhile, in a case that all of the antenna #1 102 and the antenna #2 104 of the BS 100, the UE #1 110, and the UE #2 120 are connected one another at the second time, and the UE #1 110 is connected to the antenna #2 104 of the BS 100 at the fourth time (a channel connection status case 1-2), the UE #1 110 recovers data A(2) to be received by linearly combining data which is received at the second time and data which is received at the fourth time.

For example, in a case that the data which the UE #1 110 receives at the second time is $h_{11}(2)A(2)+h_{12}(2)B(2)$, and the data which the UE #1 110 receives at the fourth time is $h_{11}(4)B(2)+h_{12}(4)A(2)$, the UE #1 110 may recover data A(2) by linearly combining $h_{11}(2)A(2)+h_{12}(2)B(2)$ and $h_{11}(4)B(2)+h_{12}(4)A(2)$. Here, $h_{11}(4)$ denotes a channel between the antenna #1 102 and the UE #1 110 at the fourth time, and $h_{12}(4)$ denotes a channel between the antenna #1 102 and the UE #2 120 at the fourth time.

Meanwhile, in a case that at the second time, the antenna #1 102 of the BS 100, the UE #1 110, and the UE #2 120 are connected one another, the antenna #2 104 of the BS 100 is connected to the UE #2 120, and the antenna #2 104 is not connected to the UE #1 110 (a channel connection status case 2), the UE #1 110 may receive data A(2) without interference at the second time, so the UE #1 110 may recover the data A(2).

In a case that at the second time, the antenna #1 102 of the BS 100 is connected to the UE #1 110, the antenna #1 102 is not connected to the UE #2 120, and the antenna #2 104 is connected to the UE #1 110 and the UE #2 120 (a channel connection status case 3), the UE #1 110 may recover data A(2) by substituting data B(2) which the UE #1 110 receives at the fourth time for data $h_{11}(2)A(2)+h_{12}(2)B(2)$ which the UE #1 110 receives at the second time or by removing the data B(2) which the UE #1 110 receives at the fourth time from the data $h_{11}(2)A(2)+h_{12}(2)B(2)$ which the UE #1 110 receives at the second time.

In a case that the antenna #1 102 and the antenna #2 104 of the BS 100 are connected to the UE #1 110 and the UE #2 120, respectively, at the second time (a channel connection status case 4), the UE #1 110 may receive A(2) without interference at the second time, so the UE #1 110 may recover A(2).

If channel connection status at the second time corresponds to one of remaining combinations except for (f) and (h) in FIG. 12, the UE #2 120 may use a data recovery scheme as expressed in Table 4 at the fourth time.

TABLE 4

$h_{21}(2)\boxed{A(2)} + h_{22}(2)B(2)$ ← t = 2    Case 1-1
↑
|
A(2) ← t = 4

$\boxed{h_{21}(2)A(2) + h_{22}(2)B(2)}$ ← t = 2    Case 1-2
$\boxed{h_{21}(4)B(2) + h_{22}(4)A(2)}$ ← t = 4 linear combination $h_{21}(2)\boxed{A(2)} + h_{22}(2)B(2)$ ← t = 2    Case 2
↑
|
A(2) ← t = 4

TABLE 4-continued

| | | | |
|---|---|---|---|
| B(2) ← t = 2 | | | Case 3 |
| B(2) ← t = 2 | | | Case 4 |

In Table 4, in a case that all of the antenna #1 102 and the antenna #2 104 of the BS 100, the UE #1 110, and the UE #2 120 are connected one another at the second time, and the UE #2 120 is not connected to the antenna #1 102 of the BS 100 at the fourth time (a channel connection status case 1-1), the UE #2 120 recovers data B(2) to be received by substituting data which is received at the fourth time for data which is received at the second time or removing the data which is received at the fourth time from the data which is received at the second time.

For example, in a case that the data which the UE #2 120 receives at the fourth time is A(2), and the data which the UE #2 120 receives at the second time is $h_{21}(2)A(2)+h_{22}(2)B(2)$, the UE #2 120 may recover B(2) by substituting A(2) for $h_{21}(2)A(2)+h_{22}(2)B(2)$. Here, $h_{21}(2)$ denotes a channel between the antenna #2 104 and the UE #1 110 at the second time, and $h_{22}(2)$ denotes a channel between the antenna #2 104 and the UE #2 120 at the second time.

Meanwhile, in a case that all of the antenna #1 102 and the antenna #2 104 of the BS 100, the UE #1 110, and the UE #2 120 are connected one another at the second time, and the UE #2 120 is connected to the antenna #1 102 of the BS 100 at the fourth time (a channel connection status case 1-2), the UE #2 120 recovers data B(2) to be received by linearly combining data which is received at the second time and data which is received at the fourth time.

For example, in a case that the data which the UE #2 120 receives at the second time is $h_{21}(2)A(2)+h_{22}(2)B(2)$, and the data which the UE #2 120 receives at the fourth time is $h_{21}(4)B(2)+h_{22}(4)A(2)$, the UE #2 120 may recover data B(2) by linearly combining $h_{21}(2)A(2)+h_{22}(2)B(2)$ and $h_{21}(4)B(2)+h_{22}(4)A(2)$. Here, $h_{21}(4)$ denotes a channel between the antenna #2 104 and the UE #1 110 at the fourth time, and $h_{22}(4)$ denotes a channel between the antenna #2 104 and the UE #2 120 at the fourth time.

Meanwhile, in a case that at the second time, the antenna #1 102 of the BS 100, the UE #1 110, and the UE #2 120 are connected one another, the antenna #2 104 of the BS 100 is connected to the UE #2 120, and the antenna #2 104 is not connected to the UE #1 100 (a channel connection status case 2), the UE #2 120 may recover data B(2) by substituting data A(2) which the UE #2 120 receives at the fourth time for the data $h_{21}(2)A(2)+h_{22}(2)B(2)$ which the UE #2 120 receives at the second time or by removing the data A(2) which the UE #2 120 receives at the fourth time from the data $h_{21}(2)A(2)+h_{22}(2)B(2)$ which the UE #2 120 receives at the second time.

In a case that at the second time, the antenna #1 102 of the BS 100 is connected to the UE #1 110, the antenna #1 102 is not connected to the UE #2 120, and the antenna #2 104 is connected to the UE #1 110 and the UE #2 120 (a channel connection status case 3), the UE #2 120 may receive B(2) without interference at the second time, so the UE #2 120 may recover B(2).

In a case that the antenna #1 102 and the antenna #2 104 of the BS 100 are connected to the UE #1 110 and the UE #2 120, respectively, at the second time (a channel connection status case 4), the UE #2 120 may receive B(2) without interference at the second time, so the UE #2 120 may recover B(2).

If channel connection status at the first time and the second time corresponds to (f) in FIG. 12, the UE #1 110 may use a data recovery scheme as expressed in Table 5 according to channel connection status at the third time.

TABLE 5

| | | |
|---|---|---|
| $h_{11}(2)A(2) + h_{12}(2)\boxed{B(2)}$ ← t = 2 | | Case 1 |
| ↑ | | |
| B(2) ← t = 3 | | |
| A(1) ← t = 1 | | |
| $h_{11}(2)A(2) + h_{12}(2)\boxed{B(2)}$ ← t = 2 | | Case 2 |
| ↑ | | |
| $h_{12}(3)\boxed{A(1)} + h_{11}(3)B(2)$ ← t = 3 | | |
| ↑ | | |
| A(1) ← t = 1 | | |

In Table 5, in a case that the UE #1 110 is not connected to the antenna #2 104 of the BS 100 at the third time (a channel connection status case 1), the UE #1 110 may receive B(2) from the BS 100 at the third time. The UE #1 110 may recover related data A(2) by substituting data B(2) which is acquired at the third time for data $h_{11}(2)A(2)+h_{12}(2)B(2)$ which is acquired at the second time. The UE #1 110 may acquire data A(1) without interference at the first time, so the UE #1 110 may recover data A(1).

In a case that the UE #1 110 is connected to the antenna #2 104 of the BS 100 at the third time (a channel connection status case 2), the UE #1 110 may receive data $h_{12}(3)A(1)+h_{11}(3)B(2)$ at the third time. So, the UE #1 110 may acquire B(2) by substituting data A(1) which the UE #1 110 receives without interference at the first time for data $h_{12}(3)A(1)+h_{11}(3)B(2)$. The UE #1 110 may recover A(2) by substituting B(2) for data $h_{11}(2)A(2)+h_{12}(2)B(2)$ which the UE #1 110 receives at the second time.

If channel connection status at the first time and the second time corresponds to (f) in FIG. 12, the UE #2 120 may use a data recovery scheme as expressed in Table 6 according to channel connection status at the third time.

TABLE 6

| | | |
|---|---|---|
| $h_{21}(1)\boxed{A(1)} + h_{22}(1)B(1)$ ← t = 1 | | Case 1 |
| ↑ | | |
| A(1) ← t = 3 | | |
| B(2) ← t = 2 | | |

TABLE 6-continued $$h_{21}(1)\boxed{A(1)} + h_{22}(1)B(1) \longleftarrow t=1 \quad \text{Case 2}$$

$$\uparrow$$

$$h_{22}(3)A(1) + h_{21}(3)\boxed{B(2)} \longleftarrow t=3$$

$$\uparrow$$

$$B(2) \longleftarrow t=2$$

In Table 6, in a case that the UE #2 120 is not connected to the antenna #1 102 of the BS 100 at the third time (a channel connection status case 1), the UE #2 120 may receive data A(1) from the BS 100 at the third time. The UE #2 120 may recover related data B(1) by substituting the data A(1) which is acquired at the third time for data $h_{21}(1)A(1)+h_{22}(1)B(1)$ which is acquired at the first time. The UE #2 120 may acquire data B(2) without interference at the second time, so the UE #2 120 may recover the data B(2).

In a case that the UE #2 120 is connected to the antenna #1 102 of the BS 100 at the third time (a channel connection status case 2), the UE #2 120 may receive data $h_{22}(3)A(1)+h_{21}(3)B(2)$ at the third time. So, the UE #2 120 may acquire data A(1) by substituting data B(2) which the UE #2 120 receives without interference at the second time for the data $h_{22}(3)A(1)+h_{21}(3)B(2)$ which the UE #2 120 receives at the third time. The UE #2 120 may recover B(1) by substituting the data A(1) for data $h_{21}(1)A(1)+h_{22}(1)B(1)$ which the UE #2 120 receives at the first time.

If channel connection status at the first time and the second time corresponds to (h) in FIG. 12, the UE #1 110 may use a data recovery scheme as expressed in Table 7 according to channel connection status at the third time.

TABLE 7

$$h_{11}(1)A(1) + h_{12}(1)\boxed{B(1)} \longleftarrow t=1 \quad \text{Case 1}$$

$$\uparrow$$

$$B(1) \longleftarrow t=3$$

$$A(2) \longleftarrow t=2$$

$$h_{11}(1)A(1) + h_{12}(1)\boxed{B(1)} \longleftarrow t=1 \quad \text{Case 2}$$

$$\uparrow$$

$$h_{12}(3)\boxed{A(2)} + h_{11}(3)B(1) \longleftarrow t=3$$

$$\uparrow$$

$$A(2) \longleftarrow t=2$$

In Table 7, in a case that the UE #1 110 is not connected to the antenna #2 104 of the BS 100 at the third time (a channel connection status case 1), the UE #1 110 may receive data B(1) from the BS 100 at the third time. The UE #1 110 may recover related data A(1) by substituting the data B(1) which is acquired at the third time for data $h_{11}(1)A(1)+h_{12}(1)B(1)$ which is acquired at the first time. The UE #1 110 may acquire data A(2) without interference at the second time, so the UE #1 110 may recover the data A(2).

In a case that the UE #1 110 is connected to the antenna #2 104 of the BS 100 at the third time (a channel connection status case 2), the UE #1 110 may receive data $h_{12}(3)A(2)+h_{11}(3)B(1)$ at the third time. So, the UE #1 110 may acquire data B(1) by substituting data A(2) which the UE #1 110 receives without interference at the second time for the data $h_{12}(3)A(2)+h_{11}(3)B(1)$ which the UE #1 110 receives at the third time. The UE #1 110 may recover A(1) by substituting the data B(1) for data $h_{11}(1)A(1)+h_{12}(1)B(1)$ which the UE #1 110 receives at the first time.

If channel connection status at the first time and the second time corresponds to (h) in FIG. 12, the UE #2 120 may use a data recovery scheme as expressed in Table 8 according to channel connection status at the third time.

TABLE 8

$$h_{21}(2)\boxed{A(2)} + h_{22}(2)B(2) \longleftarrow t=2 \quad \text{Case 1}$$

$$\uparrow$$

$$A(2) \longleftarrow t=3$$

$$B(1) \longleftarrow t=1$$

$$h_{21}(2)\boxed{A(2)} + h_{22}(2)B(2) \longleftarrow t=2 \quad \text{Case 2}$$

$$\uparrow$$

$$h_{22}(3)A(2) + h_{21}(3)\boxed{B(1)} \longleftarrow t=3$$

$$\uparrow$$

$$B(1) \longleftarrow t=1$$

In Table 8, in a case that the UE #2 120 is not connected to the antenna #1 102 of the BS 100 at the third time (a channel connection status case 1), the UE #2 120 may receive data A(2) from the BS 100 at the third time. The UE #2 120 may recover related data B(2) by substituting the data A(2) which is acquired at the third time for data $h_{21}(2)A(2)+h_{22}(2)B(2)$ which is acquired at the second time. The UE #2 120 may acquire data B(1) without interference at the first time, so the UE #2 120 may recover the data B(1).

In a case that the UE #2 120 is connected to the antenna #1 102 of the BS 100 (a channel connection status case 2), the UE #2 120 may receive data $h_{22}(3)A(2)+h_{21}(3)B(1)$ at the third time. So, the UE #2 120 may acquire data A(2) by substituting data B(1) which the UE #2 120 receives without interference at the first time for the data $h_{22}(3)A(2)+h_{21}(3)B(1)$ which the UE #2 120 receives at the third time. The UE #2 120 may recover data B(2) by substituting the data A(2) for data $h_{21}(2)A(2)+h_{22}(2)B(2)$ which the UE #2 120 receives at the second time.

Another example of an operating process of a BS in a mobile communication system according to an embodiment of the present disclosure will be described with reference to FIG. 14.

Figure 14:
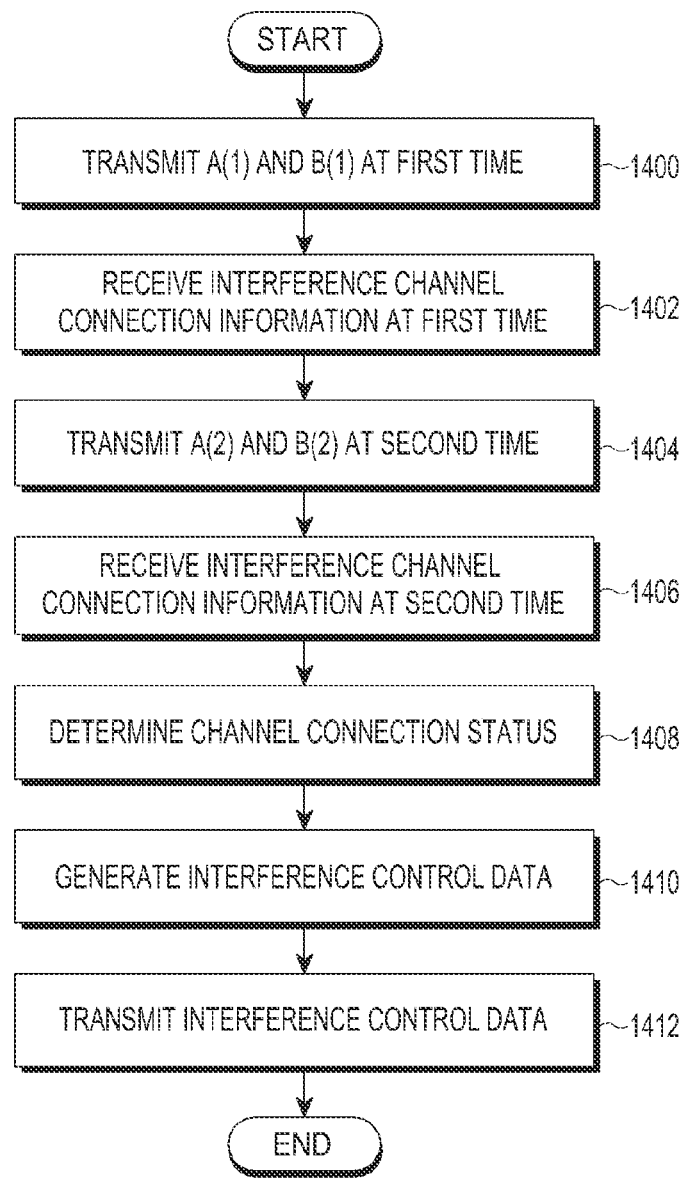
FIG. 14 schematically illustrates another example of an operating process of a BS in a mobile communication system according to an embodiment of the present disclosure.

FIG. 14 schematically illustrates another example of an operating process of a BS in a mobile communication system according to an embodiment of the present disclosure.

Referring to FIG. 14, a BS 100 transmits A(1) and B(1) to a UE #1110 and a UE #2120, respectively, using an antenna #1 102 and an antenna #2 104 at the first time at operation 1400. The BS 100 receives interference channel connection information at the first time from each of the UE #1 110 and the UE #2 120 at operation 1402. For example, the BS 100 receives information indicating whether the UE #1 110 is connected to the antenna #2 104 at the first time as the interference channel connection information from the UE #1 110, and receives information indicating whether the UE #2 110 is connected to the antenna #1 102 at the first time as the interference channel connection information from the UE #2 120.

The BS 100 transmits A(2) and B(2) to the UE #1 110 and the UE #2 120, respectively, using the antenna #1 102 and the antenna #2 104 at the second time at operation 1404. The BS 100 receives interference channel connection information at the second time from each of the UE #1 110 and the UE #2 120 at operation 1406. For example, the BS 100 receives information indicating whether the UE #1 110 is connected to the antenna #2 104 at the second time as the interference channel connection information from the UE #1 110, and receives information indicating whether the UE #2 110 is connected to the antenna #1 102 at the second time as the interference channel connection information from the UE #2 120.

The BS 100 determines channel connection status based on the interference channel connection information at the first time and the second time at operation 1408. For example, the BS 100 may determine whether the channel connection status at the first time and the second time corresponds to one of nine combinations in FIG. 12 or status in which the antenna #1 102 and the antenna #2 104 are connected to the UE #1 110 and the UE #2 120, respectively.

The BS 100 generates interference control data for each of the UE #1 110 and the UE #2 120 based on the determined channel connection status at operation 1410. The BS 100 transmits each interference control data to the UE #1 110 and the UE #2 at the third time and/or the fourth time at operation 1412.

Although FIG. 14 illustrates another example of an operating process of a BS in a mobile communication system according to an embodiment of the present disclosure, various changes could be made to FIG. 14. For example, although shown as a series of operations, various operations in FIG. 14 could overlap, occur in parallel, occur in a different order, or occur multiple times.

Another example of an operating process of a BS in a mobile communication system according to an embodiment of the present disclosure has been described with reference to FIG. 14, and another example of an operating process of a UE in a mobile communication system according to an embodiment of the present disclosure will be described with reference to FIG. 15.

Figure 15:
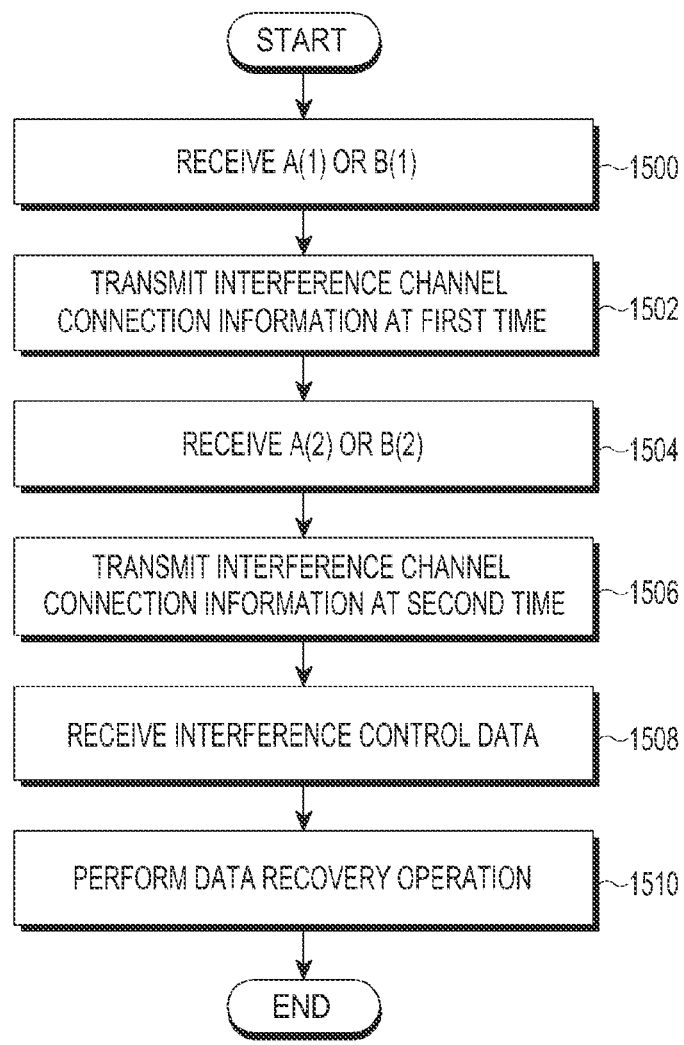
FIG. 15 schematically illustrates another example of an operating process of a UE in a mobile communication system according to an embodiment of the present disclosure.

FIG. 15 schematically illustrates another example of an operating process of a UE in a mobile communication system according to an embodiment of the present disclosure.

Referring to FIG. 15, it will be assumed that an operation in FIG. 15 may be performed in each of a UE #1 110 and a UE #2 120. A UE receives A(1) (or B(1)) which is transmitted using an antenna #1 102 (or an antenna #2 104) of a BS 100 at the first time at operation 1500. The UE generates interference channel connection information at the first time, and transmits the generated interference channel connection information to the BS 100 at operation 1502.

The UE receives A(2) (or B(2)) which is transmitted using the antenna #1 102 (or the antenna #2 104) of the BS 100 at the second time at operation 1504. The UE generates interference channel connection information at the second time, and transmits the generated interference channel connection information to the BS 100 at operation 1506.

The UE receives interference control data from the BS 100 at the third time and/or the fourth time at operation 1508. The UE performs a data recovery operation based on at least one of the data which is received at the first time and/or the second time and the interference control data at operation 1510.

Although FIG. 15 illustrates another example of an operating process of a UE in a mobile communication system according to an embodiment of the present disclosure, various changes could be made to FIG. 15. For example, although shown as a series of operations, various operations in FIG. 15 could overlap, occur in parallel, occur in a different order, or occur multiple times.

Meanwhile, in an embodiment of the present disclosure, each of such schemes may be independently used or at least two of such schemes may be combined according to a format or situation of a network.

Another example of an operating process of a UE in a mobile communication system according to an embodiment of the present disclosure has been described with reference to FIG. 15, and an inner structure of a BS in a mobile communication system according to an embodiment of the present disclosure will be described with reference to FIG. 16.

Figure 16:
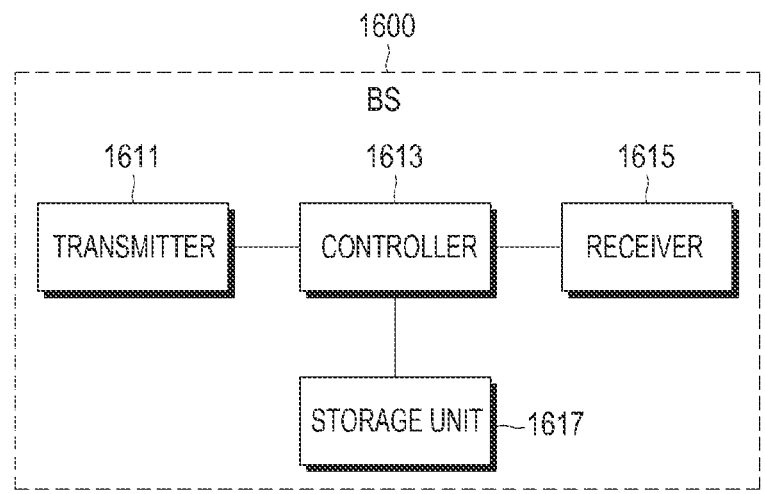
FIG. 16 schematically illustrates an inner structure of a BS in a mobile communication system according to an embodiment of the present disclosure.

FIG. 16 schematically illustrates an inner structure of a BS in a mobile communication system according to an embodiment of the present disclosure.

Referring to FIG. 16, a BS 1600 includes a transmitter 1611, a controller 1613, a receiver 1615, and a storage unit 1617.

The controller 1613 controls the overall operation of the BS 1600. More particularly, the controller 1613 controls the BS 1600 to perform an operation related to an operation of controlling interference in a mobile communication system according to an embodiment of the present disclosure. The operation related to the operation of controlling the interference in the mobile communication system according to an embodiment of the present disclosure is performed in the manner described with reference to FIGS. 1 to 15, and a description thereof will be omitted herein.

The transmitter 1611 transmits various signals, various messages, and the like to other entities, e.g., other BS or UEs under a control of the controller 1613. The various signals, the various messages, and the like transmitted in the transmitter 1611 have been described in FIGS. 1 to 15, and a description thereof will be omitted herein.

The receiver 1615 receives various signals, various messages, and the like from other entities, e.g., other BSs or UEs under a control of the controller 1613. The various signals, the various messages and the like received in the receiver 1615 have been described in FIGS. 1 to 15, and a description thereof will be omitted herein.

The storage unit 1617 stores various programs and various data necessary for the operation of the BS 1600, information related to the operation of controlling the interference according to an embodiment of the present disclosure, and the like. The storage unit 1617 stores the various signals, the various messages, and the like received in the receiver 1615.

While the transmitter 1611, the controller 1613, the receiver 1615, and the storage unit 1617 are described as separate units, it is to be understood that this is merely for convenience of description. In other words, two or more of the transmitter 1611, the controller 1613, the receiver 1615, and the storage unit 1617 may be incorporated into a single or integrated unit. The BS 1600 may be implemented as one processor.

An inner structure of a BS in a mobile communication system according to an embodiment of the present disclosure has been described with reference to FIG. 16, and an inner structure of a UE in a mobile communication system according to an embodiment of the present disclosure will be described with reference to FIG. 17.

Figure 17:
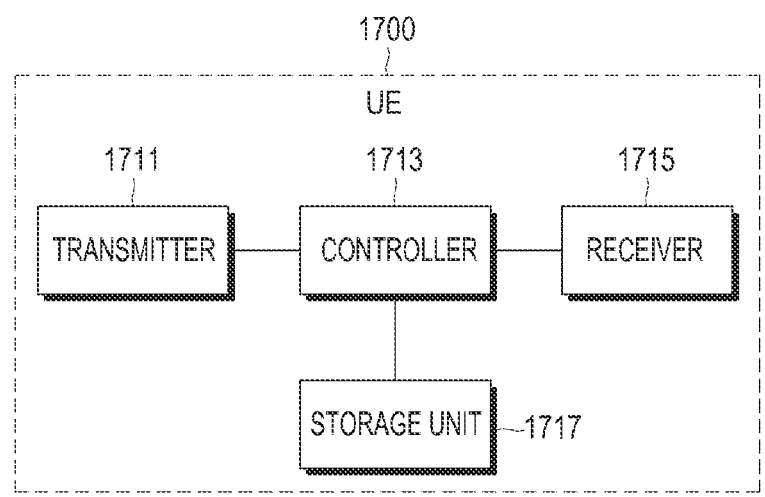
FIG. 17 schematically illustrates an inner structure of a UE in a mobile communication system according to an embodiment of the present disclosure.

FIG. 17 schematically illustrates an inner structure of a UE in a mobile communication system according to an embodiment of the present disclosure.

Referring to FIG. 17, a UE1700 includes a transmitter 1711, a controller 1713, a receiver 1715, and a storage unit 1717.

The controller 1713 controls the overall operation of the UE1700. More particularly, the controller 1713 controls the UE1700 to perform an operation related to an operation of controlling interference in a mobile communication system according to an embodiment of the present disclosure. The operation related to the operation of controlling the interference in the mobile communication system according to an embodiment of the present disclosure is performed in the manner described with reference to FIGS. 1 to 15, and a description thereof will be omitted herein.

The transmitter 1711 transmits various signals, various messages, and the like to other entities, e.g., a BS under a control of the controller 1713. The various signals, the various messages, and the like transmitted in the transmitter 1711 have been described in FIGS. 1 to 15, and a description thereof will be omitted herein.

The receiver 1715 receives various signals, various messages, and the like from other entities, e.g., a BS under a control of the controller 1713. The various signals, the various messages and the like received in the receiver 1715 have been described in FIGS. 1 to 15, and a description thereof will be omitted herein.

The storage unit 1717 stores various programs and various data necessary for the operation of the UE1700, information related to the operation of controlling the interference according to an embodiment of the present disclosure, and the like. The storage unit 1717 stores the various signals, the various messages, and the like received in the receiver 1715.

While the transmitter 1711, the controller 1713, the receiver 1715, and the storage unit 1717 are described as separate units, it is to be understood that this is merely for convenience of description. In other words, two or more of the transmitter 1711, the controller 1713, the receiver 1715, and the storage unit 1717 may be incorporated into a single unit. The UE 1700 may be implemented as one processor.

Meanwhile, in a mobile communication system according to an embodiment of the present disclosure, two data packets may be fully acquired for each UE based on an operation for the first time to the third time, so the degree of freedom of ⅔ may be acquired.

In a mobile communication system according to an embodiment of the present disclosure, even though all interference channels are not connected, one data packet may be fully acquired for each UE during one time interval, so the degree of freedom of 1 may be acquired.

In a mobile communication system according to an embodiment of the present disclosure, in a case of (f) and (h) in FIG. 12, two data packets may be fully acquired for each UE during the first time to the third time, so the degree of freedom of ⅔ may be acquired.

In a mobile communication system according to an embodiment of the present disclosure, in remaining cases except for a case of (f) and (h) in FIG. 12, two data packets may be fully acquired for each UE during the first time to the fourth time, so the degree of freedom of ½ may be acquired. As a result, in a mobile communication system according to an embodiment of the present disclosure, there is high probability of acquiring the degree of freedom which is equal to or greater than ⅔, e.g., the degree of freedom which is close to 1 according to a situation.

As is apparent from the foregoing description, an embodiment of the present disclosure enables to control interference in a mobile communication system.

An embodiment of the present disclosure enables to effectively control interference by considering cooperation among signal receiving apparatuses in a mmWave mobile communication system.

An embodiment of the present disclosure enables to effectively control interference by considering feedback time delay for interference channel connection information in a mmWave mobile communication system.

An embodiment of the present disclosure enables to effectively control interference by considering feedback time delay for interference channel connection information in a case that signal transmitting apparatuses may not know information related to a channel among the signal transmitting apparatuses and signal receiving apparatuses in a mmWave mobile communication system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling interference in a signal transmitting apparatus in a mobile communication system, the method comprising:
   transmitting data to a first signal receiving apparatus using a plurality of channels;
   receiving information indicating whether at least one of the plurality of channels exists as an interference channel of a second signal receiving apparatus from the second signal receiving apparatus;
   receiving interference control information for cancelling interference associated with the interference channel of the second signal receiving apparatus from the second signal receiving apparatus based on the received information;
   generating interference controlled data based on the interference control information; and
   transmitting the interference controlled data to the first signal receiving apparatus,
   wherein the interference control information includes information related to a phase difference between a channel which the second signal receiving apparatus uses and the at least one of the plurality of channels.

2. The method of claim 1, wherein the interference control information further includes information related to channel status of the second signal receiving apparatus.

3. A method for controlling interference in a first signal receiving apparatus in a mobile communication system, the method comprising:
   receiving data which is transmitted from a signal transmitting apparatus using a plurality of channels; and
   receiving interference controlled data from the signal transmitting apparatus,
   wherein the interference controlled data is generated based on interference control information for cancelling interference associated with an interference channel of a second signal receiving apparatus according to whether at least one of the plurality of channels exists as the interference channel of the second signal receiving apparatus,
   wherein the interference control information includes information related to a phase difference between a channel which the second signal receiving apparatus uses and the at least one of the plurality of channels.

4. The method of claim 3, wherein the interference control information further includes information related to channel status of the second signal receiving apparatus.

5. The method of claim 3, further comprising:
   performing a channel estimating operation;
   determining whether the at least one of the plurality of channels which is used for the second signal receiving apparatus exists as an interference channel based on a result of the channel estimating operation;
   transmitting interference channel connection information including information related to a result of determining whether the at least one of the plurality of channels which is used for the second signal receiving apparatus exists; and
   transmitting interference control information for cancelling interference associated with an interference channel of the first signal receiving apparatus to the signal transmitting apparatus based on the interference channel connection information.

6. The method of claim 3, further comprising:
   detecting information to be received based on the received data and the interference control data; and
   decoding the detected information.

7. A signal transmitting apparatus in a mobile communication system, the signal transmitting apparatus comprising:
   a transmitter configured to transmit data to a first signal receiving apparatus using a plurality of channels;
   a receiver configured to receive information indicating whether at least one of the plurality of channels exists as an interference channel of a second signal receiving apparatus from the second signal receiving apparatus, and receive interference control information for cancelling interference associated with an interference channel of the second signal receiving apparatus from the second signal receiving apparatus based on the received information; and
   a controller configured to generate interference controlled data based on the interference control information, and controls the transmitter to transmit the interference controlled data to the first signal receiving apparatus,
   wherein the interference control information includes information related to a phase difference between a channel which the second signal receiving apparatus uses and the at least one of the plurality of channels.

8. The signal transmitting apparatus of claim 7, wherein the interference control information further includes information related to channel status of the second signal receiving apparatus.

9. A first signal receiving apparatus in a mobile communication system, the first signal receiving apparatus comprising:
   a receiver configured to receive data which is transmitted from a signal transmitting apparatus using a plurality of channels; and
   a controller configured to control the receiver to receive interference controlled data from the signal transmitting apparatus,
   wherein the interference controlled data is generated based on control interference information for cancelling interference associated with an interference channel of a second signal receiving apparatus according to whether at least one of the plurality of channels exists as the interference channels in the second signal receiving apparatus, wherein the interference control information includes information related to a phase difference between a channel which the second signal receiving apparatus uses and the at least one of the plurality of channels.

10. The first signal receiving apparatus of claim 9, wherein the interference control information further includes information related to channel status of the second signal receiving apparatus.

11. The first signal receiving apparatus of claim 9, further comprising:
- a transmitter,
- wherein the controller performs a channel estimating operation, and determines whether the at least one of a plurality of channels which is used for the second signal receiving apparatus exists as an interference channel based on a result of the channel estimating operation,
- wherein the transmitter transmits interference channel connection information including information related to a result of whether the at least one of a plurality of channels which is used for the second signal receiving apparatus exists, and transmits interference control information for cancelling interference associated with an interference channel of the first signal receiving apparatus to the signal transmitting apparatus based on the interference channel connection information, under a control of the controller.

12. The first signal receiving apparatus of claim 9, wherein the controller detects information to be received based on the received data and the interference control data, and decodes the detected information.

\* \* \* \* \*